(12) United States Patent
Sood et al.

(10) Patent No.: US 8,161,122 B2
(45) Date of Patent: Apr. 17, 2012

(54) SYSTEM AND METHOD OF DYNAMICALLY PRIORITIZED ELECTRONIC MAIL GRAPHICAL USER INTERFACE, AND MEASURING EMAIL PRODUCTIVITY AND COLLABORATION TRENDS

(75) Inventors: Manish Chander Sood, Airmont, NY (US); Cheng-Rong Ruan, Flushing, NY (US); Alain Oberrotman, Rye Brook, NY (US)

(73) Assignee: Messagemind, Inc., New York, NY (US)

( * ) Notice: Subject to any disclaimer, the term of this patent is extended or adjusted under 35 U.S.C. 154(b) by 325 days.

(21) Appl. No.: 11/939,396

(22) Filed: Nov. 13, 2007

(65) Prior Publication Data

US 2008/0126951 A1 May 29, 2008

Related U.S. Application Data

(63) Continuation-in-part of application No. 11/144,428, filed on Jun. 3, 2005, now Pat. No. 7,941,491.

(60) Provisional application No. 60/865,338, filed on Nov. 10, 2006.

(51) Int. Cl.
*G06F 15/16* (2006.01)
(52) U.S. Cl. ........................................................ 709/206
(58) Field of Classification Search ................... 709/206
See application file for complete search history.

(56) References Cited

U.S. PATENT DOCUMENTS

| | | |
|---|---|---|
| 5,694,616 A | 12/1997 | Johnson et al. |
| 5,999,932 A | 12/1999 | Paul |
| 6,161,130 A | 12/2000 | Horvitz et al. |
| 6,182,059 B1 | 1/2001 | Angotti et al. |
| 6,327,046 B1 | 12/2001 | Miyamoto et al. |
| 6,396,513 B1 | 5/2002 | Helfman et al. |
| 6,513,026 B1 | 1/2003 | Horvitz et al. |
| 6,601,012 B1 | 7/2003 | Horvitz et al. |
| 6,654,781 B1 | 11/2003 | Browning |

(Continued)

FOREIGN PATENT DOCUMENTS

WO    WO-01/69432 A2    9/2001

OTHER PUBLICATIONS

Office Action of U.S. Appl. No. 11/144,428 issued on Jan. 4, 2010 (27 pages).

(Continued)

*Primary Examiner* — John MacIlwinen
(74) *Attorney, Agent, or Firm* — Richard J. Katz, Esq.

(57) ABSTRACT

A system and method for managing electronic communications more effectively utilizes electronic communications. The method assigns a prioritization score and category to each electronic communication so that a user can more effectively manage the communications. The user interacts with a graphical user interface to effectively manage electronic communications. The system arranges and displays the electronic communications according to prioritization scores and categories, and includes interactive modules to override a system assigned prioritization scores and assign any score or category the user selects. The method also measures productivity of users as a function of at least three different metrics, a decision-making metric; a communication metric; and a processing metric, and takes into account prioritization scores and the amount of time it takes users to effectively utilize the electronic communications. The method also generates reports of the productivity of individual users, and the productivity of relationships between multiple users of electronic communications.

28 Claims, 24 Drawing Sheets

U.S. PATENT DOCUMENTS

| | | |
|---|---|---|
| 6,654,787 B1 | 11/2003 | Aronson et al. |
| 6,708,205 B2 | 3/2004 | Sheldon et al. |
| 2002/0054117 A1 | 5/2002 | van Dantzich et al. |
| 2002/0087649 A1 | 7/2002 | Horvitz |
| 2002/0099681 A1 | 7/2002 | Gainey et al. |
| 2002/0107925 A1 | 8/2002 | Goldschneider et al. |
| 2002/0120702 A1 | 8/2002 | Schiavone et al. |
| 2002/0120705 A1 | 8/2002 | Schiavone et al. |
| 2002/0133557 A1 | 9/2002 | Winarski |
| 2002/0144026 A1 | 10/2002 | Dunlap et al. |
| 2002/0156859 A1 | 10/2002 | Wang et al. |
| 2002/0161862 A1 | 10/2002 | Horvitz et al. |
| 2002/0188683 A1 | 12/2002 | Lytle et al. |
| 2003/0009385 A1 | 1/2003 | Tucciarone et al. |
| 2003/0020749 A1 | 1/2003 | Abu-Hakima et al. |
| 2003/0046421 A1 | 3/2003 | Horvitz et al. |
| 2003/0093483 A1 | 5/2003 | Allen et al. |
| 2003/0131063 A1 | 7/2003 | Breck |
| 2003/0140088 A1 | 7/2003 | Robinson et al. |
| 2003/0172291 A1 | 9/2003 | Judge et al. |
| 2003/0182383 A1 | 9/2003 | He |
| 2003/0187937 A1* | 10/2003 | Yao et al. .................. 709/206 |
| 2003/0195937 A1 | 10/2003 | Kircher, Jr. et al. |
| 2003/0229717 A1 | 12/2003 | Teague |
| 2003/0233419 A1 | 12/2003 | Beringer |
| 2004/0019637 A1 | 1/2004 | Goodman et al. |
| 2004/0019645 A1 | 1/2004 | Goodman et al. |
| 2004/0030753 A1 | 2/2004 | Horvitz |
| 2004/0039786 A1 | 2/2004 | Horvitz et al. |
| 2004/0073617 A1 | 4/2004 | Milliken et al. |
| 2004/0098462 A1 | 5/2004 | Horvitz et al. |
| 2004/0128353 A1 | 7/2004 | Goodman et al. |
| 2004/0128359 A1 | 7/2004 | Horvitz et al. |
| 2004/0139160 A1 | 7/2004 | Wallace et al. |
| 2004/0139165 A1 | 7/2004 | McMillan et al. |
| 2004/0143636 A1 | 7/2004 | Horvitz et al. |
| 2007/0143472 A1* | 6/2007 | Clark et al. .................. 709/224 |

OTHER PUBLICATIONS

Hasegawa et al.; Automatic Priority Assignment to E-mail Messages Based on Information Extraction and User's Action History; Springer-Verlag Berlin Heidelberg 2000, pp. 573-582.

Office Action mail date Jan. 4, 2011, U.S. Appl. No. 11/144,428 (30 pages total).

Deng et al., P@RTY: A Personal Email Agent, Dept. of Computer Science Information Engineering, 4 pages, 1999.

Baiter et al., Bifrost Inbox Organizer: Giving users control over the inbox, 20 pages, 2002.

appriver, Quick, Lasting and Risk-Free Spam Solutions, http://www.appriver.com/te_over.asp, last visited Aug. 9, 2004, 3 pages.

Spam Police, http://www.fatpipeinc.com/spampolice/, last visited Aug. 9, 2004, 2 pages.

MessageLabs, http://www.massagelabs.com/us/here/anti-spam.asp?C=BAC-HAD-ML, last visited Aug. 9, 2004, 2 pages.

Refining E-Mail Messages from: Internet Complete, Copyright 1998, 1022 pp. 96-97.

Katie Hafner, Delete: Bathwater.Undelete: Baby., http://www.nytimes.com/2004/08/05/technology/circuits/05filt.html?th=&pagewanted=print...,last visited Aug. 5, 2004, 4 pages.

* cited by examiner

| Key Words Groups: | | Key Words Contain: | | | |
|---|---|---|---|---|---|
| Add | My Key Words | | SEO 2006 Kick-off | Go | Add |
| | Key Words | Kew Words | | Priority | Flag |
| | | | | All Priorities ▾ | |
| | | | | All Priorities | |
| | My Key Words | subject | | V.High | ▸ |
| | My Key Words | vaction package | | High | ▸ |
| | My Key Words | wolterskluwer | | Medium | ▸ |
| | My Key Words | Weekly Meeting | | Low | ▸ |
| | My Key Words | terms and conditions | | V.Low | |
| | My Key Words | seo 20006 kick-off meeting | | Someday | |
| | My Key Words | resolution | | None | |
| | My Key Words | Confidential: Anagram | | V.High | ▸ |
| | My Key Words | customer service | | Medium | ▸ |
| | My Key Words | J & J Meeting | | None | ▸ |
| | My Key Words | integramed.com | | None | ▸ |
| | My Key Words | gizinski | | High | ▸ |
| | My Key Words | Company Confidetial & Proprietary Information | | High | ▸ |
| | My Key Words | cash equivalent | | None | ▸ |
| | My Key Words | bank | | Low | ▸ |
| | | | OK | Cancel | Apply |

A screen display (rotated) showing:

Contacts Group: [Add] [My Contacts ☐]  Display Name (Email Address)Contain: [psanchez@xyz.com]  Priority [All Priority ▽] [Go] [Add]

| Contacts Group | Contact Name or Email Address | S.Only | Priority | Flag |
|---|---|---|---|---|
| My Contacts | psanchez@xyz.com(psanchez@xyz.com) | ☐ | V.High ▽ | ▽ |

Callout (pointing to the S.Only checkbox): "Checking this box will invoke "Priority Lock" for the select sender to "Very High" Priority"

[OK] [Cancel] [Apply]

Priority Score: V. High=100-90; High=89-75; Medium=74-50; Low=49-25; V. Low=24-10; Someday=9-0
Angle (in degrees) = - (3.6) x Priority score
R = Radius of the circle
X = Overall Average Time to Read (Based on total email received by the Recipient)
T = Average time to Read email from a given sender (sender 1, sender 2, ....sender 20)
If T = X then ½ R; if T = 2X then ¾ R; if T = ½ X then ¼ R ...

Priority Score: V. High=100-90; High=89-75; Medium=74-50; Low=49-25; V. Low=24-10; Someday=9-0
Angle (in degrees) = - (3.6) x Priority score
R = Radius of the circle
X = Overall Average Time to Read (Based on total email received by all the recipients)
T = Average Time to Read of a particular Recipient (Recipient 1, Recipient 2, .....Recipient 10)
If T = X then ½ R; if T = 2X then ¾ R; if T = ½ X then ¼ R ...

Priority Score: V. High=100-90; High=89-75; Medium=74-50; Low=49-25; V. Low=24-10; Someday=9-0
Angle (in degrees) = - (3.6) x Priority score
R = Radius of the circle
X = Overall Average Time to Read (Based on total email on the selected thread read by all the recipients)
T = Average Time to Read of a particular Recipient (Recipient 1, Recipient 2, .....Recipient 10)
If T = X then ½ R; if T = 2X then ¾ R; if T = ½ X then ¼ R ...

SYSTEM AND METHOD OF DYNAMICALLY PRIORITIZED ELECTRONIC MAIL GRAPHICAL USER INTERFACE, AND MEASURING EMAIL PRODUCTIVITY AND COLLABORATION TRENDS

CLAIM OF PRIORITY

This application claims the benefit of priority under 35 U.S.C. §119(e) of U.S. Provisional Application No. 60/865,338, filed Nov. 10, 2006, titled "Intelligent Automatic Email Prioritization and Method," and is a CIP of U.S. application Ser. No. 11/144,428 filed Jun. 3, 2005, titled "System and Method for Dynamic Adaptive User-based Prioritization and Display of Electronic Messages" which was published on Jan. 12, 2006 as U.S. Patent Application Publication No. US-2006-0010217-A1. Each of these priority applications is hereby incorporated by reference in their entirety.

FIELD OF INVENTION

The present invention relates to the management of electronic communications, and in particular to prioritizing electronic communications for the purposes of managing the communications, measuring productivity, and forming collaboration relationships through such communications.

BACKGROUND OF THE INVENTION

Various types of electronic message formats are available for communicating information among distributed computers or mobile devices for the purpose of topical discussion or topical sharing of information. This may include Voice Mail, Electronic Mail ("email"), Instant Message conversations, alerts, meeting requests and confirmations, task assignments, organization-wide document search and web search results. Among these formats, the use of email is playing a very significant role with email volume increasing by double digits year after year. Trends in unified communication where faxes, voice mail and instant messaging are being converted into email will continue to add to the volume of email being received. This dependence upon the use of email and access to email through mobile devices has created a major problem commonly referred to as "email overload".

The problem with email overload (excluding spam and junk mail, has reached an all-time high. According to our preliminary research, the average email user loses a minimum of 10 to 30 minutes or more per day of productivity managing email traffic. The problem is particularly acute for high volume computer and laptop email users (typically mid to senior management), users of wireless email devices (such as RIM Blackberry, Palm Treo, Microsoft Windows Mobile, etc) which have smaller screens and limited views, and users of internet email services (e.g. Google, Yahoo or Hotmail etc) receiving a lot of non-essential emails.

The dependence on email as the primary form of communication is placing increasing demands for time and mindshare on individuals, work professionals and managers who are very often distracted by low priority or non-essential email. This drain on productivity and effectiveness and the associated costs of infrastructure, i.e., archiving and storage of non-essential email is having negative effects across organizations. The impact is cumulative. In the existing art, there are no quantitative metrics and methodology to measure the email productivity level, and individuals and businesses have almost no visibility on the state of their email use and productivity metrics and no way to gather actionable data to implement best practices or to set up desirable bench-marks. The present invention can address one or more of these needs.

SUMMARY OF THE INVENTION

The present invention is directed to a system and method for managing electronic communications. The method and system of management allow users to more effectively utilize means of modern communication such as electronic mail ("email"), faxes, instant messages, text messages, and voice mail.

A first aspect of the present invention is a method for managing electronic communications. The method assigns a prioritization score and category to each electronic communication received or sent by a user. The prioritization score and category allow a user to more effectively manage a plurality of communications.

Another aspect of the present invention is a graphical user interface system that enables a user to effectively manage electronic communications. The system assigns prioritization scores and categories to each of a plurality of communications, and arranges and displays the electronic communications accordingly. The system also include interactive modules that allow a user to override a system assigned prioritization score and assign any prioritization score or category the user selects to an electronic communication.

Yet another aspect of the present invention is a method for measuring productivity of users of electronic communications. The measure of productivity is a function of at least three different metrics, a decision-making metric; a communication metric; and a processing metric, and takes into account prioritization scores associated with electronic communications and the amount of time it takes users to effectively utilize electronic communications. The method also includes reporting the productivity of individual users, and the productivity of collaborative relationships between multiple users of electronic communications.

These and other aspects, features, steps and advantages can be further appreciated from the accompanying figures and description of certain illustrative embodiments.

BRIEF DESCRIPTION OF THE FIGURES

FIG. 2 illustrates an existing GUI system of an electronic mail client;

FIG. 11b illustrates setting keywords in accordance with an embodiment of the present invention;

FIG. 11c illustrates setting keywords in accordance with an embodiment of the present invention;

FIG. 11d illustrates setting keywords in accordance with an embodiment of the present invention;

FIG. 11e illustrates setting keywords in accordance with an embodiment of the present invention;

FIG. 11f illustrates setting contacts in accordance with an embodiment of the present invention;

DETAILED DESCRIPTION OF THE ILLUSTRATIVE EMBODIMENTS

Figure 1:
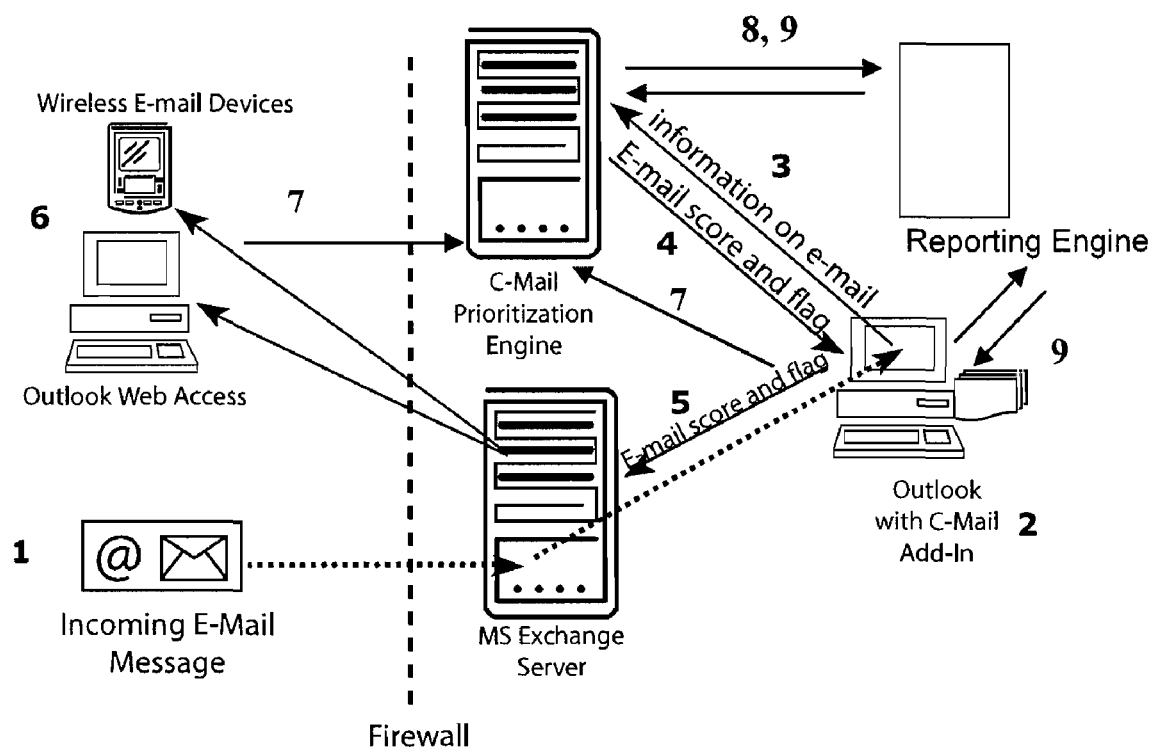
FIG. 1 illustrates an exemplary embodiment of network architecture that may be used to implement the present invention.

By way of overview and introduction, the various embodiments automatically extract intelligence from the past and present emails of a user along with learning and adapting to user's email clicking behavior; to calculate a dynamic prioritization score. In an exemplary embodiment, each email is given a score on a priority scale by a prioritization engine, is assigned a priority and is color coded according to the score, and several messages are arranged and presented to the user in the order of their priority, which helps the users focus on their most important email and thus improves responsiveness, productivity and effectiveness. The prioritization score is also used for efficient archiving and knowledge management. Unlike prior art email productivity software, the described invention does not require the user to spend significant time in setting flags or categorizing important messages in a priority order, setting up rule based email filters, and separately archiving important and unimportant email.

Each email is assigned a prioritization category based on its prioritization score. The system includes a graphical user interface ("GUI"), which displays emails in accordance of their prioritization score and groups them based on their prioritization category (represented by an easy to remember visual sign or color code). In another embodiment, a user can override and change the prioritization category assigned by the prioritization engine and this feedback is used to calculate the score of the future email or re-score the existing email. A single-click workflow is envisioned to help users identify, plan and take actions on the actionable email. The GUI enables a user to change the system calculated prioritization score and/or prioritization category of an email or a group of email with a simple single click or press of a keyboard button, and dynamically re-prioritize that selected email or group of emails along with other related messages (which are already in the mailbox or future messages).

The system keeps a record of both the system calculated prioritization score and category and the user adjusted prioritization score and category, for each email in a database. In another embodiment, the user adjusted prioritization score and category takes precedence over the system calculated score and category while displaying messages on the GUI.

The GUI also provides a single-click work-flow which helps a user identify and focus on actionable email in order of its priority, take action on the email, and archiving the email when the action is complete.

In another embodiment, the system calculates various metrics to measure email productivity of individual users or groups over select time duration, and presents this information in a set of reports (that can be user defined) to help individuals or groups monitor, implement changes and improve their email productivity, communication and collaboration levels. A user's email decision-making, email processing and email reading behavior of the prioritized email is recorded and analyzed for calculating an email productivity score and providing important reporting on productivity, collaboration and communication trends for individual and across the organization in many valuable ways. Embodiments of the invention can be characterized by one or more of the following points:

A. System Architecture;
B. System and Method of displaying dynamically prioritized email and work-flow management; and
C. System and Method of measuring email productivity and collaboration trends and displaying results thereof.

A. System Architecture (FIG. 1)

FIG. 1 illustrates a system architecture and how an embodiment according to the present invention works in conjunction with existing electronic mail ("email") software and network technologies. As an example, MS Exchange and MS Outlook both manufactured by Microsoft Corp., Redmond, Wash. are shown as email server and email client software in an enterprise environment:

Note: Step# corresponds to FIG. 1.

Step #1: The message arrives at the email client via the messaging server;

Step #2: A Client add-in analyzes the message; and

Step #3: sends the information to a Prioritization Engine residing on the user's computer and/or an enterprise server(s). (Those skilled in the art will appreciate that the Prioritization Engine may reside anywhere in a distributed computing environment including outside the corporate firewall and messages can be passed through the Prioritization Engine first and assigned a priority score before entering the messaging server).

Step #4: The prioritization engine then calculates the priority score, assigns a relevant color code or graphical image or flag, and sends that information back to the email client. The Prioritization Engine calculates scores using several dynamic and adaptive, fuzzy logic filters (reference the non-provisional application Ser. No. 11/144,428 filed Jun. 3, 2005). These filters analyze inherent information in the email as well as situational factors associated with an email, and compare this to the user's email behavior. This prioritization process is completed within a very short time, less than few seconds.

Step #5: The email client synchronizes the score and the flag with the Exchange server. Those skilled in the art will appreciate that the Prioritization engine may very well directly talk to the Messaging Server (MS Exchange in the above diagram, or Web Server in case of Internet Email Providers such as email services offered by Google, Yahoo or MSN Hotmail etc) and update the priority score with or without going through the Email Client (MS Outlook in the above Figure).

Step #6: MS Exchange Server synchronizes the prioritized email information with Web Email Client and/or Servers (for instance with MS Outlook Web Access) and Wireless Email Client and Servers (for instance with Blackberry Server manufactured by RIM). Therefore, if a user accesses email from any other computer within the corporate firewall, or via browser or VPN from outside the corporate firewall, he/she will still have the prioritized information on all emails.

Those in the art will appreciate that the system can reside anywhere on the network, gather user email clicking behavior information and directly synchronize the prioritization score and any related information with the web, wireless and computer email software.

Step #7: An interactive GUI residing on the computer, wireless or web email software, displays several prioritized messages arranged in the order of their priority score and priority category. As the user processes those prioritized messages, the GUI analyzes the user's clicking events and sends that data to the Prioritization Engine. This learning helps in further improving the accuracy of the Prioritization Engine (reference the non-provisional application Ser. No. 11/144, 428 filed Jun. 3, 2005).

Step #8: The Prioritization Engine synchronizes the system and user prioritization data, and the user's clicking events on the email to a Productivity Reporting Engine. The Productivity Reporting Engine calculates various productivity metrics, communication and collaboration trends and presents interactive reports to the user, groups and the company's management. The reporting interface can be invoked from within the interactive GUI described in the invention and/or in a web browser based interface.

Step #9: The user, groups and the management review the productivity metrics and the trends, and provide feedback which through the reporting engine is looped to the Prioritization Engine. This feedback loop further improves the accuracy of the email prioritization, calculating productivity metrics and reporting of the metrics and trends.

B. System and Method of Displaying Dynamically Prioritized Email and Workflow Management B.1 Existing Art Email System GUI (FIG. 2)

A typical busy user, particularly managers and C-level executives, have to deal on an ongoing basis with what has been described as "email overload." This email overload is caused by not only the quantity of email received, but also by the way it is inevitably handled by the user, often resulting in complex folder structures. In addition to complex folder structure, users also end up creating an ever growing quantity of folders, or deleting or moving the email to folders after the action has been completed. In the current art, important emails are not automatically separated and prioritized from the unimportant email based on the recipient's priority.

Figure 2:
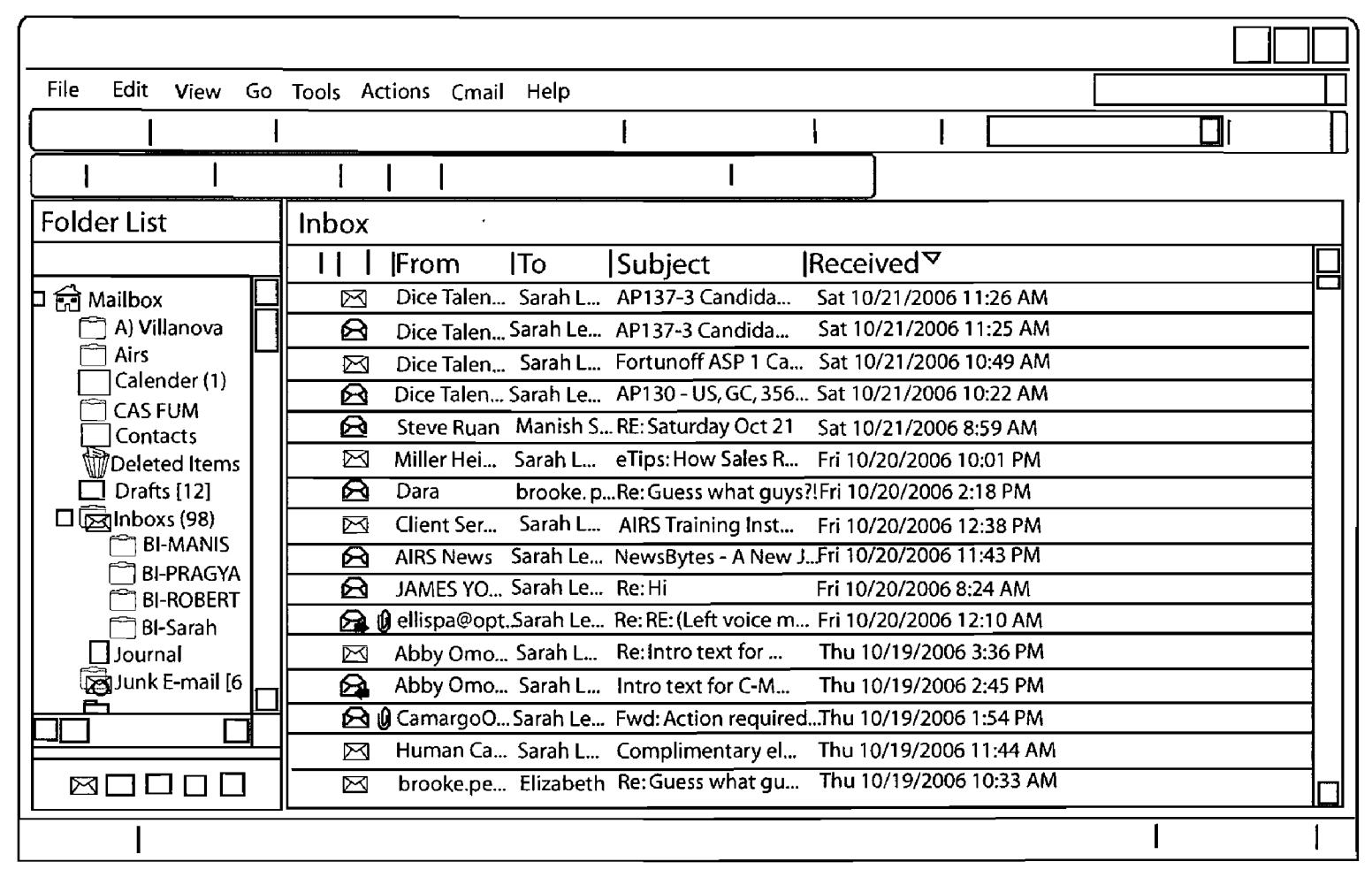

FIG. 2 displays a typical existing art email inbox, with messages arranged by date and time stamp. All priority ranges are in one place. In the existing art, important messages can not be separated, categorized or differentiated unless perhaps the user takes the time to manually flag each message, set up (static) auto filter rules, assign topic, or perhaps manually type search words.

Figure 3:
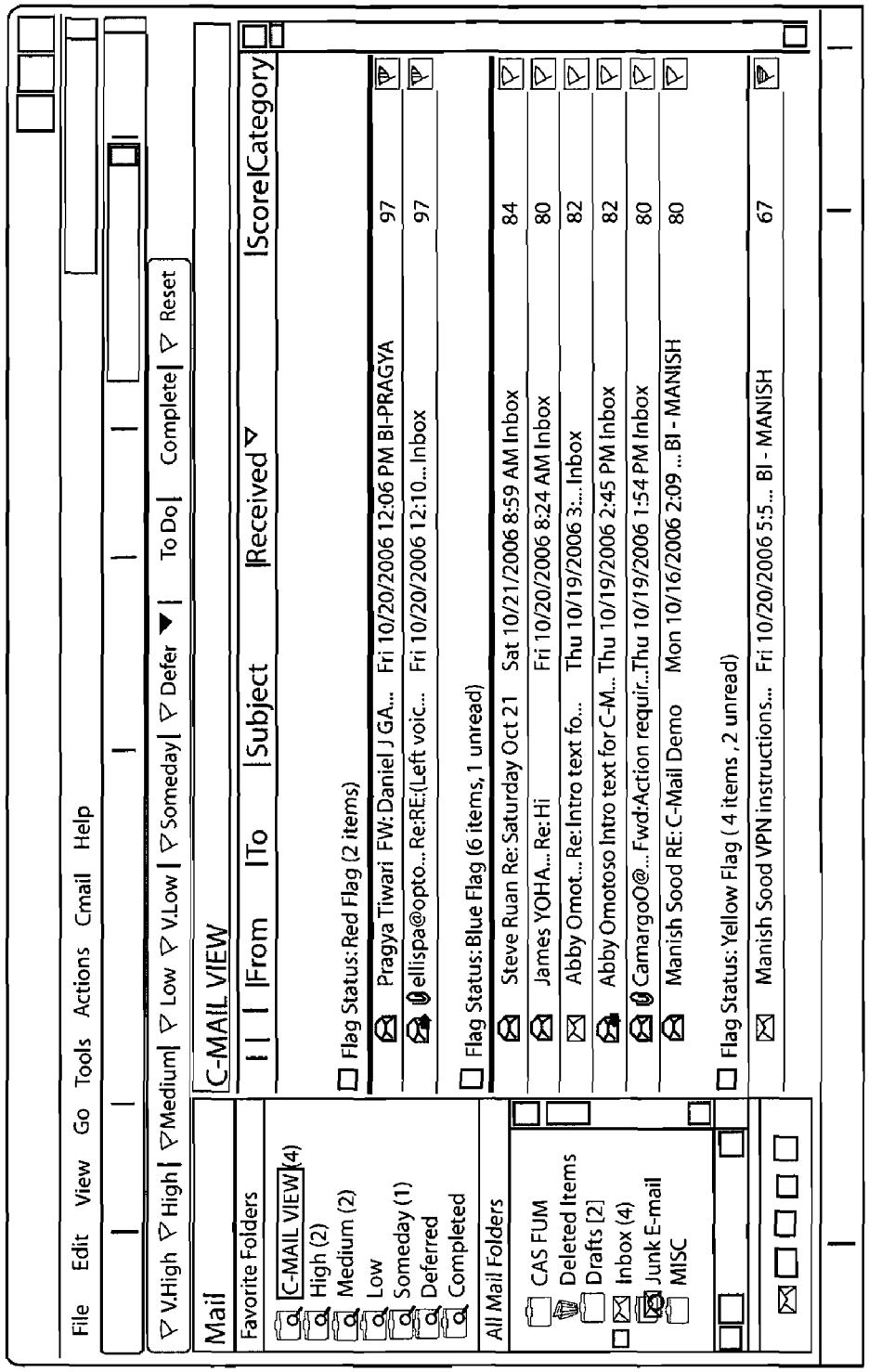
FIG. 3 illustrates a dynamically prioritized GUI system in accordance with an embodiment of the present invention.

B.2 Explanation of Dynamically Prioritized Email GUI (FIG. 3)

One embodiment of the invention can be characterized by a GUI (FIG. 3) which displays incoming messages arranged in decreasing order of prioritization categories: Very High Category at the top (Red Flag), followed by High category (Blue Flag), Medium category (Orange Flag), Low Category (Green Flag), Very Low Category (Orange Flag) and Someday category (Purple Flag). Although this exemplary embodiment utilizes six prioritization categories, as would be understood by a person of ordinary skill in the art, any number of prioritization categories can be used.

To help user focus on each category of messages, a set of corresponding folders may be provided which will only display the relevant category of messages received over a selected time period. For example, upon clicking or scrolling on the Medium Priority Folder (on the left side) only Medium Priority email (categorized as Yellow Flags) received in the last 2 days will be displayed to the user.

Similarly, to help the user focus on the new unread messages in each priority category, a set of corresponding folders may be provided which may only display the relevant category of unread messages over a selected time period. For example, upon clicking or scrolling on the Unread High Priority Folder (not shown in the figure), only unread High Priority email (categorized as Red and Blue Flag) received in the last 7 days may be displayed to the user.

In another embodiment, messages sent by the user, task lists, meeting invitations, electronic voice messages are also prioritized and categorized, and are displayed in the prioritized order along with messages received similar to the system described above.

The GUI System and the method of display can be further characterized by one or more of the following points:

a) Prioritization Score

Each email (including but not limited to email messages, meeting invites, faxes, voice mails, task lists located in Inbox or Sent Folders) is assigned a "System Prioritization Score" on a Scale of 0 to 100 by the Prioritization Engine. In an exemplary embodiment the score of 100 represents the highest priority email and 0 represents the lowest priority email to the recipient.

b) Prioritization Category

To be able to implement a simple and user-friendly system, specific score ranges are associated with a Priority Category. Each Priority Category is then illustrated by an easy to remember graphical image or color code or text (GUI display). For example, a flag color-code system is illustrated in Table 1.

TABLE 1

Prioritization Score, Category and Display Classification

| Prioritization Score | Priority Category | GUI Display of the Prioritization Category |
| --- | --- | --- |
| 90 to 100 | Very High (V. High) | Red Flag |
| 75 to 89 | High | Blue Flag |
| 50 to 74 | Medium | Yellow Flag |
| 25 to 49 | Low | Green Flag |
| 10 to 24 | Very Low (V. Low) | Orange Flag |
| 0 to 9 | Someday (user may possibly need it someday in future) | Purple Flag | c) Gathering User's Feedback

A user may change the System Calculated Priority Category and/or System Calculated Prioritization Score to his/her desired Prioritized Category and/or Prioritization Score (for details please refer Section Dynamic Prioritization). The "User assigned Prioritization Score and/or Category" will take precedence over the "System calculated Prioritization Score/Category" and the GUI will accordingly update its prioritized email view. In another embodiment, user is not allowed to adjust the System Prioritization Score until his management approves such change.

d) View of Prioritized Email

In another embodiment, a user is provided various views of his/her prioritized email so that the user will always have on hand a quick visual display of his/her priorities. For instance, looking at the C-MAIL View (FIG. 3, Table 2), a user will be able to see at a glance that there are 2 Very High Priority emails (Red flag) and both are already read, and 6 High Priority email (Blue flag) out of which 1 is unread.

To further characterize the embodiment, a user may select to include one or more of the following Virtual View Folders in the customizable GUI system:

d.1) C-MAIL View Folder (illustrated in Table 2, FIG. 3)
d.2) C-MAIL Unread View Folder (illustrated in Table 3)
d.3) High Folder (illustrated in Table 4)
d.4) Medium Folder (illustrated in Table 5)
d.5) Low Folder (illustrated in Table 6)
d.6) Someday Folder (illustrated in Table 7)
d.7) Defer Folder (illustrated in Table 8)
d.8) To-Do Folder (illustrated in Table 9)
d.9) Completed Folder (illustrated in Table 10)

TABLE 2

C-MAIL View Folder (illustrating one of the default settings)

| Email Priority Category | GUI Display | Time Duration[1] | Workflow rules | Read/Unread/ALL[2] |
|---|---|---|---|---|
| Very High | Red Flag | All | 1. Any email designated as "Complete" will immediately move out of the view.<br>2. Any email designated as "Defer" will immediately move out of the view, and will return to the view 15 minutes before the Defer Set Time. | <ALL> |
| High | Blue Flag | Last <4> days | 1. Any email designated as "To-Do" will not move out of the view (even after the 4-day duration)<br>2. Any email designated as "Defer" or "Complete" will immediately move out of the view | <ALL> |

| Email Priority Category | GUI Display | Time Duration[3] | Workflow rules | Read/Unread/ALL[4] |
|---|---|---|---|---|
| Medium | Yellow Flag | Last <2> days | 1. Any email designated as "To-Do" will not move out of the view (even after the 2-day duration)<br>2. Any email designated as "Defer" or "Complete" will immediately move out of the view | <ALL> |
| Low | Green Flag | Last <2> days | 1. Any email designated as "To-Do" will not move out of the view (even after the 2-day duration)<br>2. Any email designated as "Defer" or "Complete" will immediately move out of the view | <ALL> |
| Very Low | Orange Flag | Last <2> days | 1. Any email designated as "To-Do" will not move out of the view (even after the 2-day duration)<br>2. Any email designated as "Defer" or "Complete" will immediately move out of the view | <ALL> |
| Someday | Purple Flag | Last <2> days | 1. Any email designated as "To-Do" will not move out of the view (even after the 2-day duration)<br>2. Any email designated as "Defer" or "Complete" will immediately move out of the view | <ALL> |
| To-Do | To-Do | All (all the "To-Do" email may be sorted to display at the top of the view) | 1. Any email designated as "To-Do" will stay in the view forever until the email status is changed to "Defer", "Complete" or "Reset".<br>"Reset" or "Clicking on To-Do" twice removes the "To-Do" designation | <ALL><br>Email will become "Read" when designated as "To-Do" |
| Defer | Defer | All (all "Defer" email will be displayed at the bottom of the view) | 1. Email will move out of the view when designated "Defer"<br>2. Email will return to the view 15 minutes before the 'Set Defer Time' (in the Red Flag category or its original prioritization category of the email - setting decided by user) | <ALL><br>Email will become "Read" when designated as "Defer" |
| Complete | Complete | Last <7> days (email completed in the last 7 days will be displayed at the bottom of the view) | 1. Will not move out of the prioritized flag view if designated as "Complete".<br>2. Will move out of the view when designated as "Defer" or "Completed" | <ALL><br>Email will become "Read" when designated as "Completed" |

Note:
Email can be moved out of the view by deleting or archiving. Also by changing the flag can result it to be out of the view. For instance if a Red Flag email which was received 10 days ago is changed to Blue Flag it will fall out of the C-MAIL view (only last 4 days of the Blue Flag email are displayed in the View). User can customize the view based on his/her work habits such as including or excluding prioritization category (ies), changing the time duration for any category, or any workflow rules and Read/Unread settings.
[1]duration elapsed between the time when the email was received and the present time (when user is viewing the GUI
[2]Different duration parameters can be set for read messages and unread messages. User may select only one option "read" or "unread"
[3]duration elapsed between the time when the email was received and the present time (when user is viewing the GUI)
[4]Different duration parameters can be set for read messages and unread messages. User may select only one option "read" or "unread"

TABLE 3

C-MAIL View Unread Folder (illustrating one of the default settings)

| Email Priority Category | GUI Display | Time Duration[5] | Workflow rules | Read/Unread/Both[6] |
|---|---|---|---|---|
| Very High | Red Flag | All | 1. Any email designated as "Complete" will immediately move out of the view.<br>2. Any email designated as "Defer" will immediately move out of the view, and will return to the view 15 minutes before the Defer Set Time. | <Unread> |
| High | Blue Flag | Last <4>days | 1. Any email designated as "To-Do" will not move out of the view (even after the 4-day duration)<br>2. Any email designated as "Defer" or "Complete" will immediately move out of the view | <Unread> |
| Medium | Yellow Flag | Last <2> days | 1. Any email designated as "To-Do" will not move out of the view (even after the 2-day duration)<br>2. Any email designated as "Defer" or "Complete" will immediately move out of the view | <Unread> |
| Low | Green Flag | Last <2> days | 1. Any email designated as "To-Do" will not move out of the view (even after the 2-day duration)<br>2. Any email designated as "Defer" or "Complete" will immediately move out of the view | <Unread> |
| Very Low | Orange Flag | Last <2> days | 1. Any email designated as "To-Do" will not move out of the view (even after the 2-day duration)<br>2. Any email designated as "Defer" or "Complete" will immediately move out of the view | <Unread> |
| Someday | Purple Flag | Last <2> days | 1. Any email designated as "To-Do" will not move out of the view (even after the 2-day duration)<br>2. Any email designated as "Defer" or "Complete" will immediately move out of the view | <Unread> |
| To-Do | To-Do | None | 1. Any email designated as "To-Do" will stay in the view forever until the email status is changed to "Defer", "Complete" or "Reset".<br>"Reset" or "Clicking on To-Do" twice removes the "To-Do" designation | Not Applicable |
| Defer | Defer | None | 1. Email will move out of the view when designated "Defer"<br>2. Email will return to the view 15 minutes before the 'Set Defer Time" (in the Red Flag category or its original prioritization category of the email - setting decided by user) | Not Applicable |

| Email Priority Category | GUI Display | Time Duration[7] | Workflow rules | Read/Unread/Both[8] |
|---|---|---|---|---|
| Complete | Complete | None | 1. Will not move out of the prioritized flag view if designated as "Complete".<br>2. Will move out of the view when designated as "Defer" or "Completed" | Not Applicable |

Note:
Email can be moved out of the view by deleting or archiving. Also by changing the flag can result it to be out of the view. For instance as soon as a Red Flag unread email is read it will fall out of the C-MAIL Unread view (only last 7 days of the Blue Flag email are displayed in the View) User can customize the view based on his/her work habits such as including or excluding prioritization category (ies), changing the time duration for any category, or any workflow rules and Read/Unread settings.
[5]duration elapsed between the time when the email was received and the present time (when user is viewing the GUI)
[6]Different duration parameters can be set for read messages and unread messages. User may select only one option "read" or "unread"

C-Mail View shown in FIG. 3 is the default view based on the criteria defined in Table 1, of course, as desired, a user can customize the view. If a user would like to look at one priority category at a time, the user can scroll or click on each respective folder under the C-Mail View. All "Very High" category and "High" category emails can be viewed in "High" folder view (Table 4), all "Medium" category emails can be viewed in "Medium" folder view (Table 5), all "Low" and "Very Low" categories in "Low" folder view (Table 6), and all "Someday" priority emails can be viewed under "Someday" folder view (Table 7).

TABLE 4

High Folder (illustrating one of the default settings)

| Email Priority Category | GUI Display | Time Duration[9] | Workflow rules | Read/Unread/ALL[10] |
|---|---|---|---|---|
| Very High | Red Flag | Last <7> Days | 1. Any email designated as "Complete" will immediately move out of the view. | <ALL> |

TABLE 4-continued

| | | | High Folder (illustrating one of the default settings) | |
|---|---|---|---|---|
| High | Blue Flag | Last <7> days | 2. Any email designated as "Defer" will immediately move out of the view, and will return to the view 15 minutes before the Defer Set Time.<br>1. Any email designated as "To-Do" will not move out of the view (even after the 4-day duration)<br>2. Any email designated as "Defer" or "Complete" will immediately move out of the view | <ALL> |

| Email Priority Category | GUI Display | Time Duration[11] | Workflow rules | Read/Unread/ALL[12] |
|---|---|---|---|---|
| Medium | Yellow Flag | None | 1. Any email designated as "To-Do" will not move out of the view (even after the 2-day duration)<br>2. Any email designated as "Defer" or "Complete" will immediately move out of the view | Not Applicable |
| Low | Green Flag | None | 1. Any email designated as "To-Do" will not move out of the view (even after the 2-day duration)<br>2. Any email designated as "Defer" or "Complete" will immediately move out of the view | Not Applicable |
| Very Low | Orange Flag | None | 1. Any email designated as "To-Do" will not move out of the view (even after the 2-day duration)<br>2. Any email designated as "Defer" or "Complete" will immediately move out of the view | Not Applicable |
| Someday | Purple Flag | None | 1. Any email designated as "To-Do" will not move out of the view (even after the 2-day duration)<br>2. Any email designated as "Defer" or "Complete" will immediately move out of the view | Not Applicable |
| To-Do | To-Do | Only applicable to V.High and High | 1. Any email designated as "To-Do" will stay in the view forever until the email status is changed to "Defer", "Complete" or "Reset".<br>"Reset" or "Clicking on To-Do" twice removes the "To-Do" designation | <ALL>Email will become "Read" when designated as "To-Do" |
| Defer | Defer | Only applicable to V.High and High | 1. Email will move out of the view when designated "Defer"<br>2. Email will return to the view 15 minutes before the 'Set Defer Time" (in the Red Flag category or its original prioritization category of the email - setting decided by user) | <ALL>Email will become "Read" when designated as "Defer" |
| Complete | Complete | Last <7> days. Only applicable to V.High and High | 1. Will not move out of the prioritized flag view if designated as "Complete".<br>2. Will move out of the view when designated as "Defer" or "Completed" | <ALL>Email will become "Read" when designated as "Completed" |

Note:
Email can be moved out of the view by deleting or archiving. Also by changing the flag can result it to be out of the view. For instance if a Red Flag email which was received 6 days ago is changed to Yellow Flag it will fall out of the High Folder view (only last 4 days of the Blue Flag email are displayed in the View). User can customize the view based on his/her work habits such as including or excluding prioritization category (ies), changing the time duration for any category, or any workflow rules and Read/Unread settings.
[7]duration elapsed between the time when the email was received and the present time (when user is viewing the GUI)
[8]Different duration parameters can be set for read messages and unread messages. User may select only one option "read" or "unread"
[9]duration elapsed between the time when the email was received and the present time (when user is viewing the GUI)
[10]Different duration parameters can be set for read messages and unread messages. User may select only one option "read" or "unread"
[11]duration elapsed between the time when the email was received and the present time (when user is viewing the GUI)
[12]Different duration parameters can be set for read messages and unread messages. User may select only one option "read" or "unread"

TABLE 5

| | | | Medium Folder (illustrating one of the default settings) | |
|---|---|---|---|---|

| Email Priority Category | GUI Display | Time Duration[13] | Workflow rules | Read/Unread/ALL[14] |
|---|---|---|---|---|
| Very High | Red Flag | None | 1. Any email designated as "Complete" will immediately move out of the view.<br>2. Any email designated as "Defer" will immediately move out of the view, and will return to the view 15 minutes before the Defer Set Time. | Not Applicable |
| High | Blue Flag | None | 1. Any email designated as "To-Do" will not move out of the view (even after the 4-day duration)<br>2. Any email designated as "Defer" or "Complete" will immediately move out of the view | Not Applicable |
| Medium | Yellow Flag | Last <7> days | 1. Any email designated as "To-Do" will not move out of the view (even after the 2-day duration)<br>2. Any email designated as "Defer" or "Complete" will immediately move out of the view | <ALL> |

TABLE 5-continued

| Email Priority Category | GUI Display | Time Duration | Workflow rules | Read/Unread/ALL |
|---|---|---|---|---|
| Low | Green Flag | None | 1. Any email designated as "To-Do" will not move out of the view (even after the 2-day duration) 2. Any email designated as "Defer" or "Complete" will immediately move out of the view | Not Applicable |
| Very Low | Orange Flag | None | 1. Any email designated as "To-Do" will not move out of the view (even after the 2-day duration) 2. Any email designated as "Defer" or "Complete" will immediately move out of the view | Not Applicable |
| Someday | Purple Flag | None | 1. Any email designated as "To-Do" will not move out of the view (even after the 2-day duration) 2. Any email designated as "Defer" or "Complete" will immediately move out of the view | Not Applicable |
| To-Do | To-Do | Only applicable to Medium | 1. Any email designated as "To-Do" will stay in the view forever until the email status is changed to "Defer", "Complete" or "Reset". "Reset" or "Clicking on To-Do" twice removes the "To-Do" designation | <ALL> Email will become "Read" when designated as "To-Do" |
| Defer | Defer | Only applicable to Medium | 1. Email will move out of the view when designated "Defer" 2. Email will return to the view 15 minutes before the 'Set Defer Time" (in the Red Flag category or its original prioritization category of the email—setting decided by user) | <ALL> Email will become "Read" when designated as "Defer" |

| Email Priority Category | GUI Display | Time Duration[15] | Workflow rules | Read/Unread/ALL[16] |
|---|---|---|---|---|
| Complete | Complete | Last <7> days Only applicable to Medium | 1. Will not move out of the prioritized flag view if designated as "Complete". 2. Will move out of the view when designated as "Defer" or "Completed" | <ALL> Email will become "Read" when designated as "Completed" |

Note:
Email can be moved out of the view by deleting or archiving. Also by changing the flag can result it to be out of the view. For instance if a Red Flag email which was received 10 days ago is changed to Blue Flag it will fall out of the C-MAIL view (only last 4 days of the Blue Flag email are displayed in the View).

[13] duration elapsed between the time when the email was received and the present time (when user is viewing the GUI)

[14] Different duration parameters can be set for read messages and unread messages. User may select only one option "read" or "unread"

TABLE 6

Low Folder (illustrating one of the default settings)

| Email Priority Category | GUI Display | Time Duration[17] | Workflow rules | Read/Unread/ALL[18] |
|---|---|---|---|---|
| Very High | Red Flag | None | 1. Any email designated as "Complete" will immediately move out of the view 2. Any email designated as "Defer" will immediately move out of the view, and will return to the view 15 minutes before the Defer Set Time | Not Applicable |
| High | Blue Flag | None | 1. Any email designated as "To-Do" will not move out of the view (even after the 4-day duration) 2. Any email designated as "Defer" or "Complete" will immediately move out of the view | Not Applicable |
| Medium | Yellow Flag | None | 1. Any email designated as "To-Do" will not move out of the view (even after the 2-day duration) 2. Any email designated as "Defer" or "Complete" will immediately move out of the view | Not Applicable |
| Low | Green Flag | Last <7> days | 1. Any email designated as "To-Do" will not move out of the view (even after the 2-day duration) 2. Any email designated as "Defer" or "Complete" will immediately move out of the view | <ALL> |
| Very Low | Orange Flag | Last <7> days | 1. Any email designated as "To-Do" will not move out of the view (even after the 2-day duration) | <ALL> |

TABLE 6-continued

Low Folder (illustrating one of the default settings)

| | | | 2. Any email designated as "Defer" or "Complete" will immediately move out of the view | |
|---|---|---|---|---|
| Email Priority Category | GUI Display | Time Duration[19] | Workflow rules | Read/Unread/ ALL[20] |
| Someday | Purple Flag | None | 1. Any email designated as "To-Do" will not move out of the view (even after the 2-day duration) 2. Any email designated as "Defer" or "Complete" will immediately move out of the view | Not Applicable |
| To-Do | To-Do | Only applicable to Low and V. Low | 1. Any email designated as "To-Do" will stay in the view forever until the email status is changed to "Defer", "Complete" or "Reset". "Reset" or "Clicking on To-Do" twice removes the "To-Do" designation | <ALL> Email will become "Read" when designated as "To-Do" |
| Defer | Defer | Only applicable to Low and V. Low | 1. Email will move out of the view when designated "Defer" 2. Email will return to the view 15 minutes before the 'Set Defer Time" (in the Red Flag category or its original prioritization category of the email - setting decided by user) | <ALL> Email will become "Read" when designated as "Defer" |
| Complete | Complete | Last <7> days Only applicable to Low and V. Low | 1. Will not move out of the prioritized flag view if designated as "Complete". 2. Will move out of the view when designated as "Defer" or "Completed" | <ALL> Email will become "Read" when designated as "Completed" |

Note:
Email can be moved out of the view by deleting or archiving. Also by changing the flag can result it to be out of the view. For instance if a Red Flag email which was received 10 days ago is changed to Blue Flag it will fall out of the C-MAIL view (only last 4 days of the Blue Flag email are displayed in the View).
[15]duration elapsed between the time when the email was received and the present time (when user is viewing the GUI)
[16]Different duration parameters can be set for read messages and unread messages. User may select only one option "read" or "unread"
[17]duration elapsed between the time when the email was received and the present time (when user is viewing the GUI)
[18]Different duration parameters can be set for read messages and unread messages. User may select only one option "read" or "unread"

TABLE 7

Someday Folder (illustrating one of the default settings)

| Email Priority Category | GUI Display | Time Duration[21] | Workflow rules | Read/Unread/ ALL[22] |
|---|---|---|---|---|
| Very High | Red Flag | None | 1. Any email designated as "Complete" will immediately move out of the view 2. Any email designated as "Defer" will immediately move out of the view, and will return to the view 15 minutes before the Defer Set Time | Not Applicable |

| Email Priority Category | GUI Display | Time Duration[23] | Workflow rules | Read/Unread/ ALL[24] |
|---|---|---|---|---|
| High | Blue Flag | None | 1. Any email designated as "To-Do" will not move out of the view (even after the 4-day duration) 2. Any email designated as "Defer" or "Complete" will immediately move out of the view | Not Applicable |
| Medium | Yellow Flag | None | 1. Any email designated as "To-Do" will not move out of the view (even after the 2-day duration) 2. Any email designated as "Defer" or "Complete" will immediately move out of the view | Not Applicable |
| Low | Green Flag | None | 1. Any email designated as "To-Do" will not move out of the view (even after the 2-day duration) 2. Any email designated as "Defer" or "Complete" will immediately move out of the view | Not Applicable |
| Very Low | Orange Flag | None | 1. Any email designated as "To-Do" will not move out of the view (even after the 2-day duration) 2. Any email designated as "Defer" or "Complete" will immediately move out of the view | Not Applicable |
| Someday | Purple Flag | Last <7> days | 1. Any email designated as "To-Do" will not move out of the view (even after the 2-day duration) 2. Any email designated as "Defer" or "Complete" will immediately move out of the view | <ALL> |
| To-Do | To-Do | Only applicable to Someday | 1. Any email designated as "To-Do" will stay in the view forever until the email status is changed to "Defer", | <ALL> Email will |

TABLE 7-continued

Someday Folder (illustrating one of the default settings)

| | | | "Complete" or "Reset". "Reset" or "Clicking on To-Do" twice removes the "To-Do" designation | become "Read" when designated as "To-Do" |
|---|---|---|---|---|
| Defer | Defer | Only applicable to Low and V. Low | 1. Email will move out of the view when designated "Defer" 2. Email will return to the view 15 minutes before the 'Set Defer Time" (in the Red Flag category or its original prioritization category of the email - setting decided by user) | <ALL> Email will become "Read" when designated as "Defer" |
| Complete | Complete | Last <7> days Only applicable to Low and V. Low | 1. Will not move out of the prioritized flag view if designated as "Complete". 2. Will move out of the view when designated as "Defer" or "Completed" | <ALL> Email will become "Read" when designated as "Completed" |

Note:
Email can be moved out of the view by deleting or archiving. Also by changing the flag can result it to be out of the view. For instance if a Red Flag email which was received 10 days ago is changed to Blue Flag it will fall out of the C-MAIL view (only last 4 days of the Blue Flag email are displayed in the View).
[19]duration elapsed between the time when the email was received and the present time (when user is viewing the GUI)
[20]Different duration parameters can be set for read messages and unread messages. User may select only one option "read" or "unread"
[21]duration elapsed between the time when the email was received and the present time (when user is viewing the GUI)
[22]Different duration parameters can be set for read messages and unread messages. User may select only one option "read" or "unread"
[23]duration elapsed between the time when the email was received and the present time (when user is viewing the GUI)
[24]Different duration parameters can be set for read messages and unread messages. User may select only one option "read" or "unread"

In another embodiment, a user may customize the view to suit his/her work habits. For example, he/she may increase or decrease the number of Prioritized View folders being displayed, arrange them in different order, change the duration of email to show in any respective folder. For instance, in FIG. 3 there are six View Folders being displayed with "High" Folder View at the top and "Completed" Folder at the bottom. A busy user may decide to have only two folders such as "High" Folder View at the top followed by "C-MAIL View" Folder. Moreover, the user may decide to customize "High" Folder to display "Very High Priority" and "High Priority" email for the last 7 days.

Another embodiment involves that a user may customize the view to set different duration for read and unread messages under the same priority category of messages. Taking the same example as above, the user may set that the "High" Folder View should show the latest 7 days "Unread High Priority" emails, however only latest 3 days "Read High Priority" emails. User may also change the label of folders e.g. User may label "Someday" folder to "Future Reference" or change the label of "High Priority" folder to "A-List".

In yet another embodiment the system can be an independent email messaging application.

Another embodiment includes applications where the system can integrate with any other independent email client applications or Internet email applications with or without that email client application being launched or opened simultaneously. The applications of the invention may also include whether the full or smaller version of the system can be implemented on hand-held devices or cell phone devices.

Figure 4:
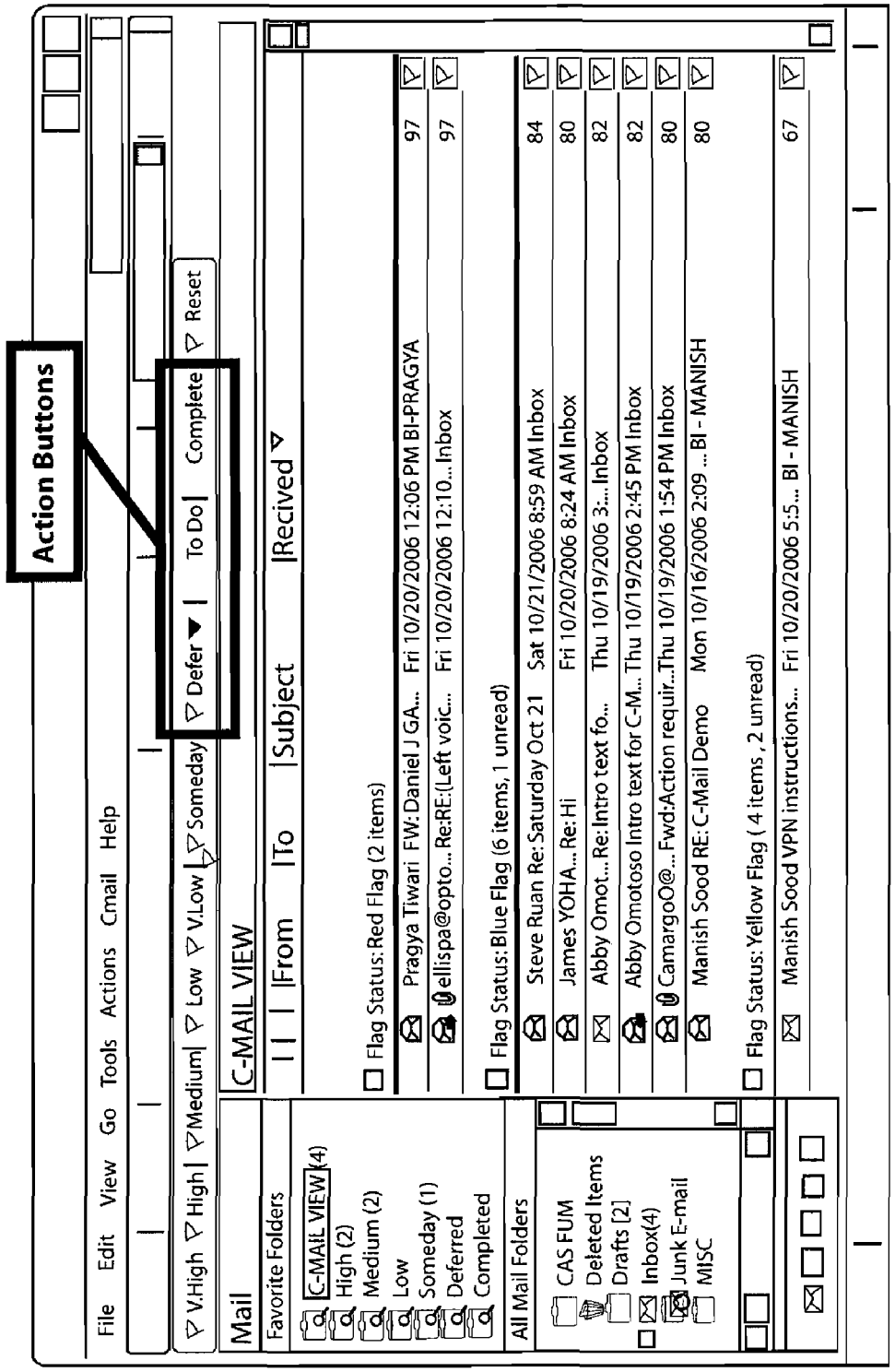
FIG. 4 illustrates a single click workflow in accordance with an embodiment of the present invention.

B.3 Explanation of Workflow of Dynamically Prioritized Email (FIG. 4)

Another embodiment of the invention can be characterized by an effective single-click workflow for the busy email users. The embodiment includes Action Buttons (Refer FIG. 4) that help user take specific actions on the prioritized email (both in inbox and sent items), or take the email out of the prioritized view with one click and that too, without leaving the prioritized email view. The workflow GUI, therefore, helps a user to not only focus on the high priority emails but also take actions and complete the actions related to the respective emails.

Figure 5:
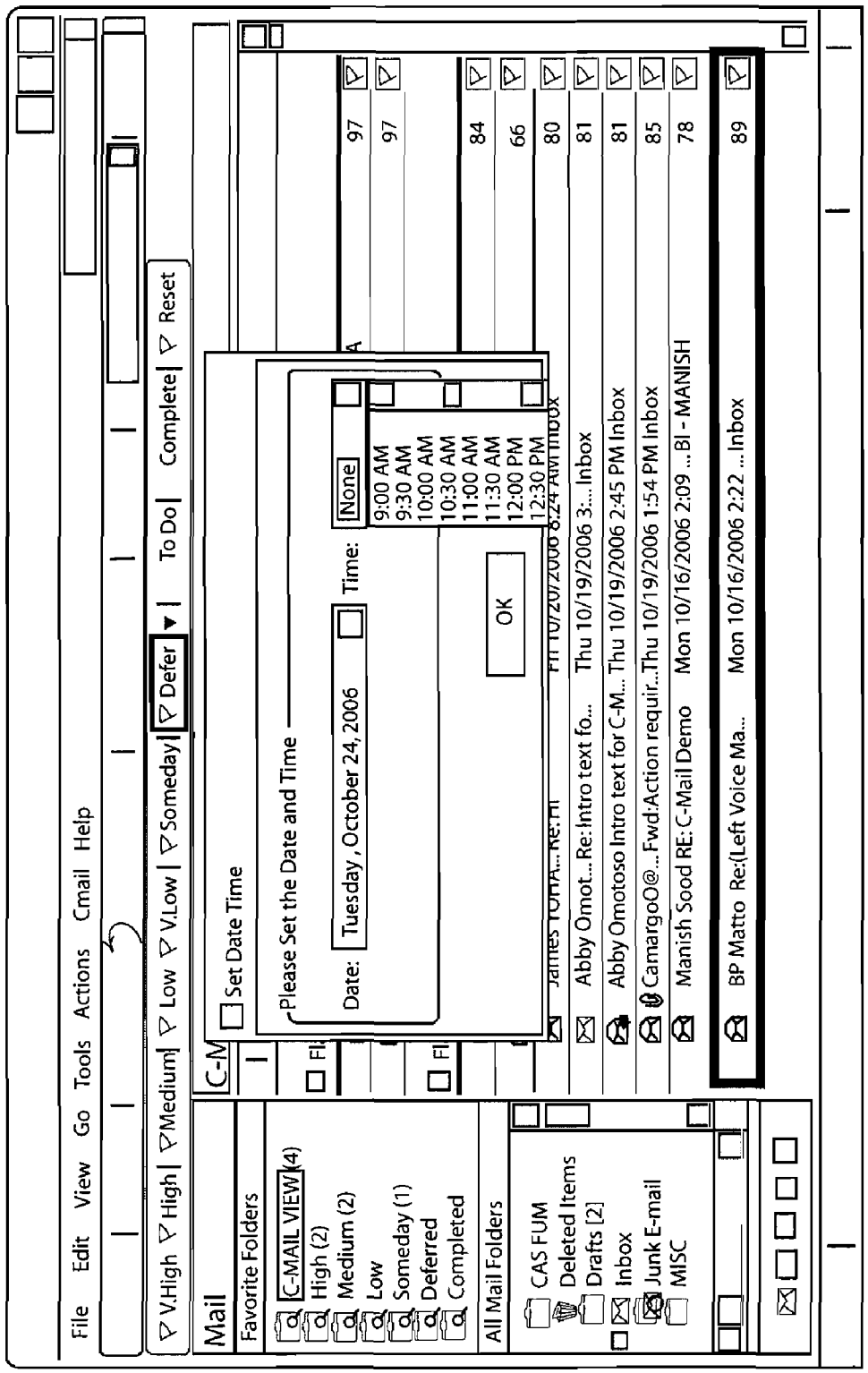
FIG. 5 illustrates defer functionality in accordance with an embodiment of the present invention.

One or more of the following points can further characterize the embodiment:

a) Defer (FIG. 5)

If a user wants to simply take an e-mail (or group of email) out of the prioritized view, and deal with it at a later date, he/she will select the email, click "Defer", select a date and time, and click OK. On the selected future date, that deferred email will appear 15 minutes before time (or any user defined time interval) under "Very High" priority category (or the original category of the email, as customized by the user). For example, if a user selects a "Medium" Priority email (or multiple email) and click "Defer" to 4:00 pm on Oct. 15, 2007 and clicks OK. The email will move out of the Medium Folder View to "Deferred" Folder view. At 3:45 pm on Oct. 15, 2007 the email will appear in "Very High" Priority Category (or the original "Medium" Priority Category as customized by the user). At 4:00 pm, the email will become "To-Do" (refer To-Do Section below) unless the user takes any action on it or deletes it.

TABLE 8

Defer Folder (illustrating one of the default settings)

| Email Priority Category | GUI Display | Time Duration[25] | Workflow rules | Read/Unread/ALL[26] |
|---|---|---|---|---|
| Very High | Red Flag | None | 1. Any email designated as "Complete" will immediately move out of the view | Not Applicable |

TABLE 8-continued

Defer Folder (illustrating one of the default settings)

| | | | | |
|---|---|---|---|---|
| | | | 2. Any email designated as "Defer" will immediately move out of the view, and will return to the view 15 minutes before the Defer Set Time | |
| High | Blue Flag | None | 1. Any email designated as "To-Do" will not move out of the view (even after the 4-day duration)<br>2. Any email designated as "Defer" or "Complete" will immediately move out of the view | Not Applicable |
| Medium | Yellow Flag | None | 1. Any email designated as "To-Do" will not move out of the view (even after the 2-day duration)<br>2. Any email designated as "Defer" or "Complete" will immediately move out of the view | Not Applicable |

| Email Priority Category | GUI Display | Time Duration[27] | Workflow rules | Read/Unread/ALL[28] |
|---|---|---|---|---|
| Low | Green Flag | None | 1. Any email designated as "To-Do" will not move out of the view (even after the 2-day duration)<br>2. Any email designated as "Defer" or "Complete" will immediately move out of the view | Not Applicable |
| Very Low | Orange Flag | None | 1. Any email designated as "To-Do" will not move out of the view (even after the 2-day duration)<br>2. Any email designated as "Defer" or "Complete" will immediately move out of the view | Not Applicable |
| Someday | Purple Flag | None | 1. Any email designated as "To-Do" will not move out of the view (even after the 2-day duration)<br>2. Any email designated as "Defer" or "Complete" will immediately move out of the view | Not Applicable |
| To-Do | To-Do | None | 1. Any email designated as "To-Do" will stay in the view forever until the email status is changed to "Defer", "Complete" or "Reset".<br>"Reset" or "Clicking on To-Do" twice removes the "To-Do" designation | Not Applicable |
| Defer | Defer | ALL | 1. Email will move out of the view when designated "Defer"<br>2. Email will return to the view 15 minutes before the 'Set Defer Time" (in the Red Flag category or its original prioritization category of the email - setting decided by user) | <ALL> Applicable. Email will become "Read" when designated as "Defer" |
| Complete | Complete | None | 1. Will not move out of the prioritized flag view if designated as "Complete".<br>2. Will move out of the view when designated as "Defer" or "Completed" | Not Applicable |

Figure 6A:
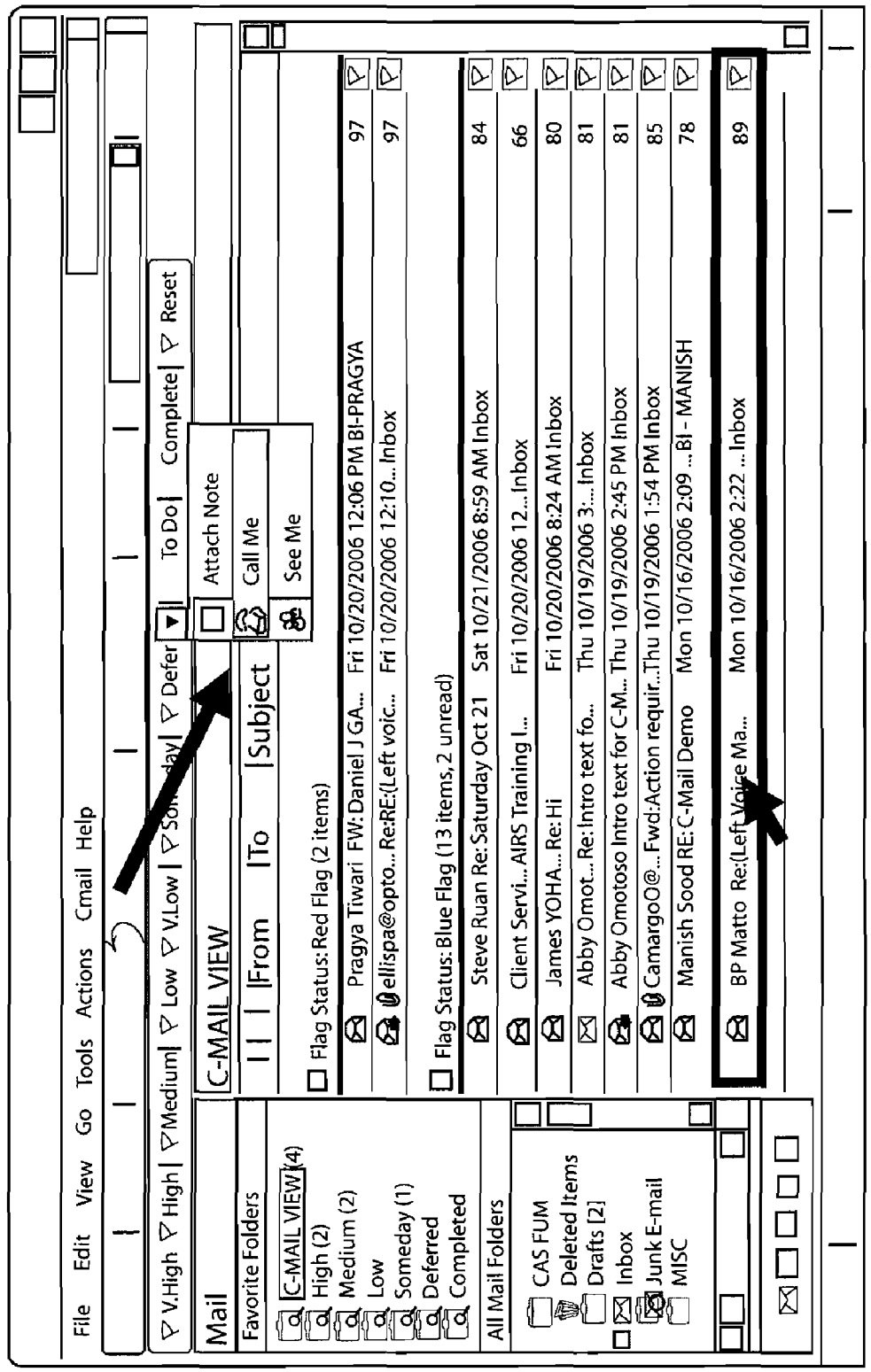
FIG. 6a illustrates quick action functionality in accordance with an embodiment of the present invention.

Note:
Email can be moved out of the view by deleting or archiving. Also by changing the flag can result it to be out of the view. For instance if a Red Flag email which was received 10 days ago is changed to Blue Flag it will fall out of the C-MAIL view (only last 4 days of the Blue Flag email are displayed in the View). User can customize the view based on his/her work habits such as including or excluding prioritization category (ies), changing the time duration for any category, or any workflow rules and Read/Unread settings.
[25] duration elapsed between the time when the email was received and the present time (when user is viewing the GUI)
[26] Different duration parameters can be set for read messages and unread messages. User may select only one option "read" or "unread"
[27] duration elapsed between the time when the email was received and the present time (when user is viewing the GUI)
[28] Different duration parameters can be set for read messages and unread messages. User may select only one option "read" or "unread"

b) Quick Action (FIG. 6a)

Figure 6B:
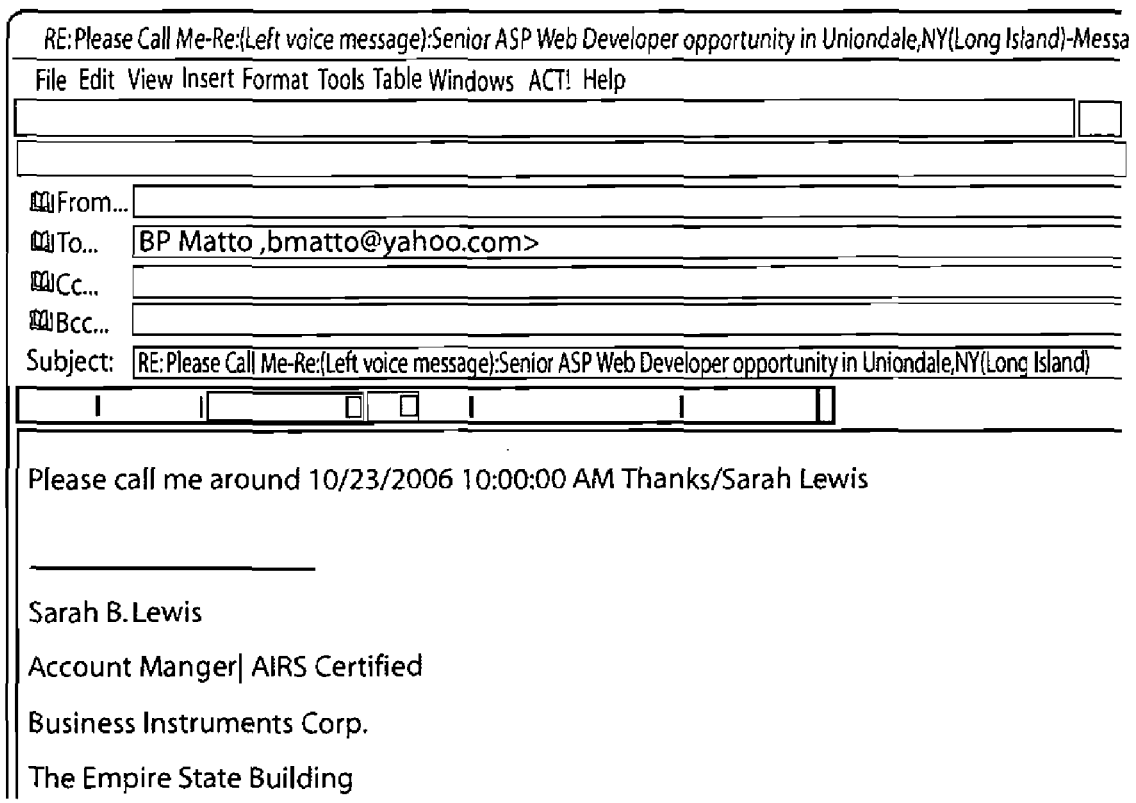
FIG. 6b illustrates an example of the "Call Me" quick action functionality in accordance with an embodiment of the present invention.

If a user wants to take a specific action on an email, such as request the sender to call him/her at a designated time, user may select the email, click on the drop down button next to the Defer button, select Call Me, choose the date and time the user want the sender to call him/her, and the System will create a new form message requesting a call from the recipient (as shown in FIG. 6b). A similar "See Me" button is provided to send an email reply to have the sender meet with the user at a particular day and time. Obviously, the email draft for "Call Me" and "See Me" can be customized by the user. By Clicking on "Attach Notes" user will be able to attach his/her notes to that particular email and later on sorts the email with the attached notes. This functionality is important for the users to note down his/her thought process associated with an email while reviewing an email, this functionality is also helpful for the secretaries to make notes for their supervisors and vice versa.

TABLE 9

To-Do Folder (illustrating one of the default settings)

| Email Priority Category | GUI Display | Time Duration[29] | Workflow rules | Read/Unread/ALL[30] |
|---|---|---|---|---|
| Very High | Red Flag | None | 1. Any email designated as "Complete" will immediately move out of the view<br>2. Any email designated as "Defer" will immediately move out of the view, and will return to the view 15 minutes before the Defer Set Time | Not Applicable |
| High | Blue Flag | None | 1. Any email designated as "To-Do" will not move out of the view (even after the 4-day duration)<br>2. Any email designated as "Defer" or "Complete" will immediately move out of the view | Not Applicable |
| Medium | Yellow Flag | None | 1. Any email designated as "To-Do" will not move out of the view (even after the 2-day duration)<br>2. Any email designated as "Defer" or "Complete" will immediately move out of the view | Not Applicable |
| Low | Green Flag | None | 1. Any email designated as "To-Do" will not move out of the view (even after the 2-day duration)<br>2. Any email designated as "Defer" or "Complete" will immediately move out of the view | Not Applicable |
| Very Low | Orange Flag | None | 1. Any email designated as "To-Do" will not move out of the view (even after the 2-day duration)<br>2. Any email designated as "Defer" or "Complete" will immediately move out of the view | Not Applicable |

| Email Priority Category | GUI Display | Time Duration[31] | Workflow rules | Read/Unread/ALL[32] |
|---|---|---|---|---|
| Someday | Purple Flag | None | 1. Any email designated as "To-Do" will not move out of the view (even after the 2-day duration)<br>2. Any email designated as "Defer" or "Complete" will immediately move out of the view | Not Applicable |
| To-Do | To-Do | ALL | 1. Any email designated as "To-Do" will stay in the view forever until the email status is changed to "Defer", "Complete" or "Reset".<br>"Reset" or "Clicking on To-Do" twice removes the "To-Do" designation | <ALL> Email will become "Read" when designated as "To-Do" |
| Defer | Defer | None | 1. Email will move out of the view when designated "Defer"<br>2. Email will return to the view 15 minutes before the 'Set Defer Time" (in the Red Flag category or its original prioritization category of the email - setting decided by user) | Not Applicable. |
| Complete | Complete | None | 1. Will not move out of the prioritized flag view if designated as "Complete".<br>2. Will move out of the view when designated as "Defer" or "Completed" | Not Applicable. |

Figure 7:
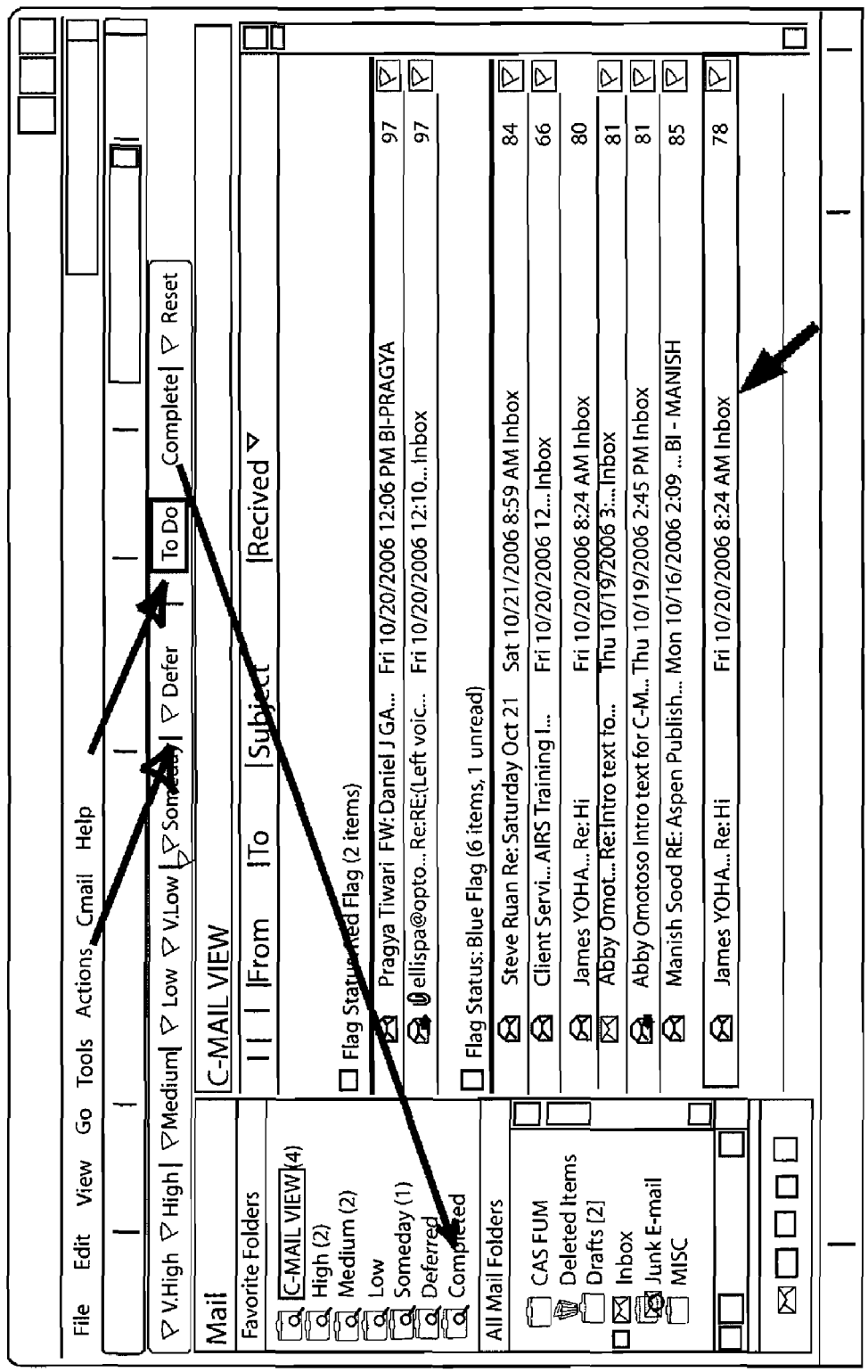
FIG. 7 illustrates To-Do functionality in accordance with an embodiment of the present invention.

Note:
Email can be moved out of the view by deleting or archiving. Also by changing the flag can result it to be out of the view. For instance if a Red Flag email which was received 10 days ago is changed to Blue Flag it will fall out of the C-MAIL view (only last 4 days of the Blue Flag email are displayed in the View). User can customize the view based on his/her work habits such as including or excluding prioritization category (ies), changing the time duration for any category, or any workflow rules and Read/Unread settings.
[29]duration elapsed between the time when the email was received and the present time (when user is viewing the GUI)
[30]Different duration parameters can be set for read messages and unread messages. User may select only one option "read" or "unread"
[31]duration elapsed between the time when the email was received and the present time (when user is viewing the GUI)
[32]Different duration parameters can be set for read messages and unread messages. User may select only one option "read" or "unread"

c) To Do (FIG. 7)

If a user has an email message, or several messages he/she wants to take action on, the user can select the desired message(s) (in any one of the Priority Categories) and click TO DO button. The message will change to a specified color and will stay in its respective priority folder view until the users clears it our (by clicking on "Complete" button explained below). The invention is not so limited as to require the use of colors. Other mechanisms to distinguish between priorities, as would be known to a person of skill in the art, are equally acceptable (e.g., icons, symbols, numbers, etc.).

In FIG. 7, an email from James Yoha Subject: Hi, Time: 10/17/2006 10.4 . . . is highlighted and after clicking on "To-Do" button, the email is displayed in red font (refer FIG. 6a). As you will notice this did not change the priority category/flag or the prioritization score (it is still High Priority/Blue Flag, 78 prioritization score). The GUI (FIG. 6a) shows the prioritized email including the actionable email (designated as "To-Do"/shown in Red Font).

In another embodiment, a view of "To-Do" email sorted in a prioritized manner is displayed to the user, when the user clicks on or scrolls on the "To-Do" folder.

Another embodiment involves that any email with "Very High Priority/Red Flag" automatically becomes a "To-Do" and is displayed as such (in a different color font), or the system considers it as "To-Do" even though visually it doesn't appear as "To-Do" email.

d) Complete (FIG. 7)

When a user has completed an action associated with an email, irrespective of the fact that the user had marked the email to To-Do or Defer, the user can select the email (or group of email) and click on "Complete" button, and the selected email will now be set to "Complete" Status. This action will remove the email designated as "Completed" from the view of prioritized email and move them into a "Completed" Folder. User can set "Complete" status to any prioritized email including the email which is not designated as "To-Do" or "Defer".

In another embodiment upon clicking "Complete" button, the highlighted email is automatically archived or moved to a relevant folder. The GUI system observes and remembers what the user did last time when a similar email (sent by the same sender or similar topic or similar priority score) was marked "Complete." For instance if a user physically dragged and dropped an email marked "Complete" to a particular folder, next time when the user hits "Complete" on the similar score or sender email it will be automatically moved to the same folder. Similarly if the user deleted or archived the "Complete" email, the system will automatically prompt the user to approve processing the similar "Complete" email accordingly. The user can customize the intended processing to the email after he/she designates them to "Complete" status. For example, user will be able to select another folder or another processing rule if the system prompted rule is not suitable.

TABLE 10

| Completed Folder (illustrating one of the default settings) | | | | |
| --- | --- | --- | --- | --- |
| Email Priority Category | GUI Display | Time Duration[33] | Workflow rules | Read/Unread/ALL[34] |
| Very High | Red Flag | None | 1. Any email designated as "Complete" will immediately move out of the view<br>2. Any email designated as "Defer" will immediately move out of the view, and will return to the view 15 minutes before the Defer Set Time | Not Applicable |
| High | Blue Flag | None | 1. Any email designated as "To-Do" will not move out of the view (even after the 4-day duration)<br>2. Any email designated as "Defer" or "Complete" will immediately move out of the view | Not Applicable |
| Medium | Yellow Flag | None | 1. Any email designated as "To-Do" will not move out of the view (even after the 2-day duration)<br>2. Any email designated as "Defer" or "Complete" will immediately move out of the view | Not Applicable |
| Low | Green Flag | None | 1. Any email designated as "To-Do" will not move out of the view (even after the 2-day duration)<br>2. Any email designated as "Defer" or "Complete" will immediately move out of the view | Not Applicable |
| Very Low | Orange Flag | None | 1. Any email designated as "To-Do" will not move out of the view (even after the 2-day duration)<br>2. Any email designated as "Defer" or "Complete" will immediately move out of the view | Not Applicable |
| Someday | Purple Flag | None | 1. Any email designated as "To-Do" will not move out of the view (even after the 2-day duration)<br>2. Any email designated as "Defer" or "Complete" will immediately move out of the view | Not Applicable |
| To-Do | To-Do | None | 1. Any email designated as "To-Do" will stay in the view forever until the email status is changed to "Defer", "Complete" or "Reset".<br>"Reset" or "Clicking on To-Do" twice removes the "To-Do" designation | Not Applicable |
| Email Priority Category | GUI Display | Time Duration[35] | Workflow rules | Read/Unread/ALL[36] |
| Defer | Defer | None | 1. Email will move out of the view when designated "Defer"<br>2. Email will return to the view 15 minutes before the 'Set Defer Time" (in the Red | Not Applicable |

TABLE 10-continued

Completed Folder (illustrating one of the default settings)

Flag category or its original prioritization category of the email - setting decided by user)
designated as "Defer" or "Completed"    "Completed"

Note:
Email can be moved out of the view by deleting or archiving. Also by changing the flag can result it to be out of the view. For instance if a Red Flag email which was received 10 days ago is changed to Blue Flag it will fall out of the C-MAIL view (only last 4 days of the Blue Flag email are displayed in the View). User can customize the view based on his/her work habits such as including or excluding prioritization category (ies), changing the time duration for any category, or any workflow rules and Read/Unread settings.

Figure 8:
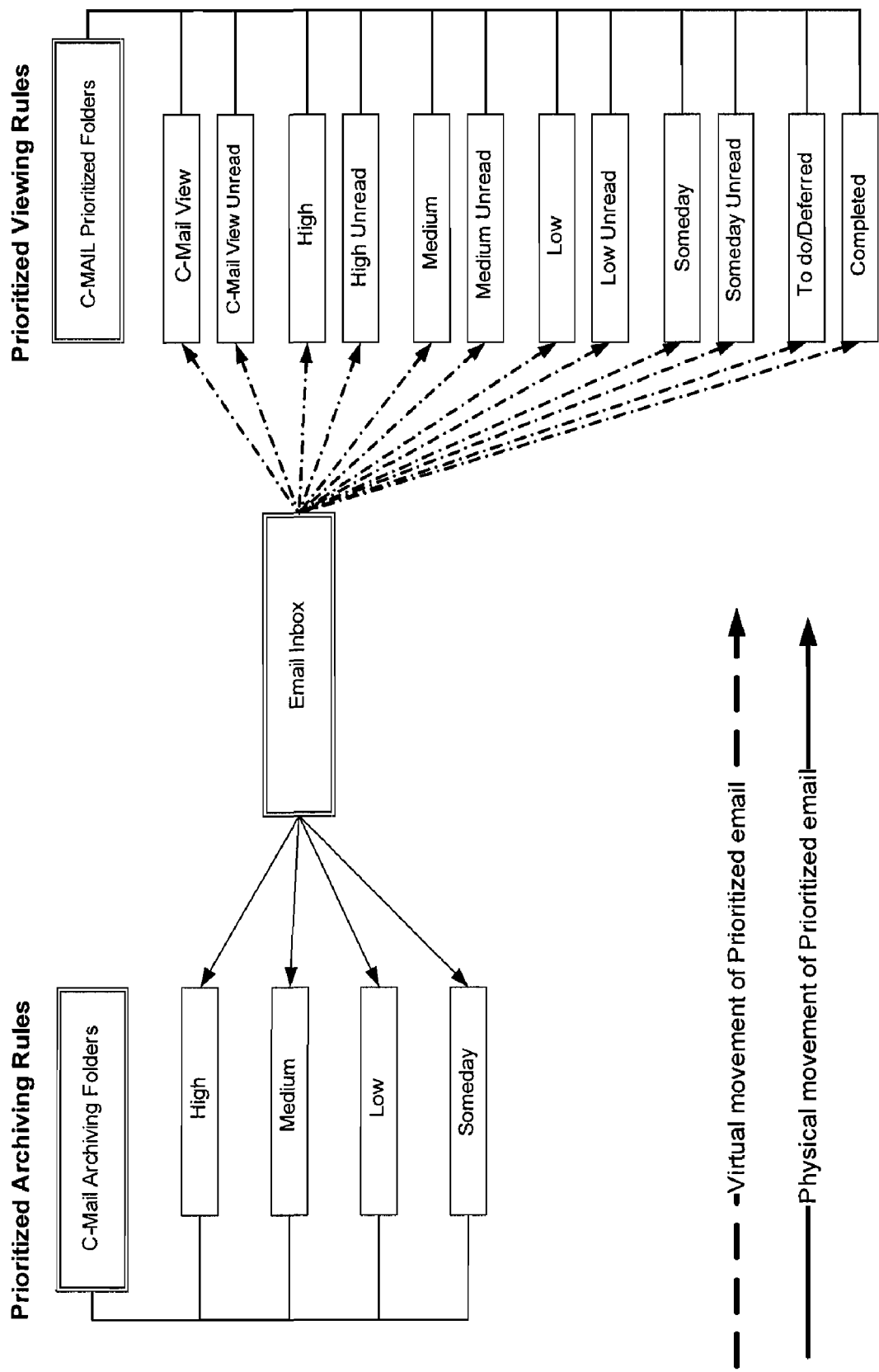
FIG. 8 illustrates prioritized archiving in accordance with an embodiment of the present invention.
Figure 9:
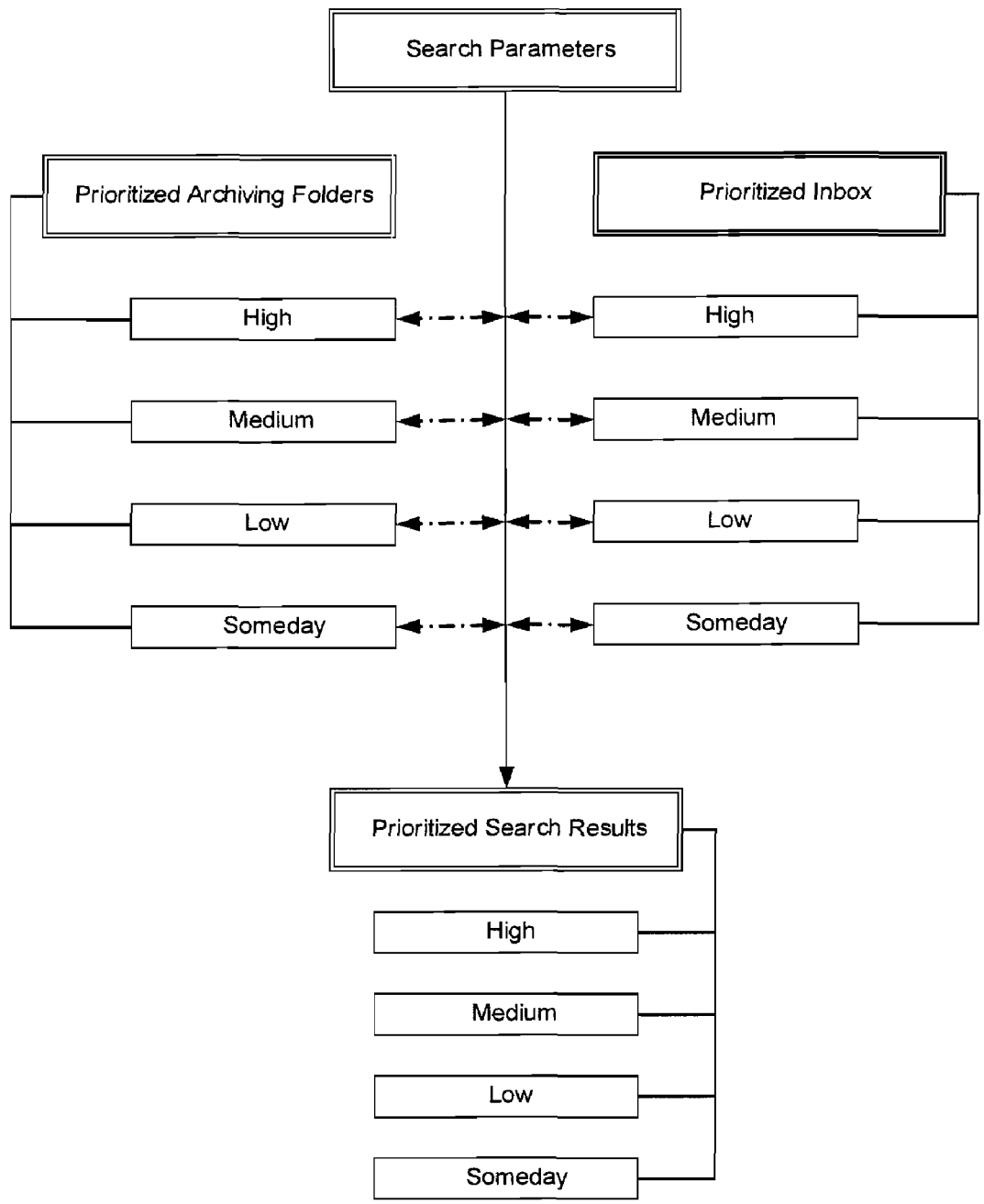
FIG. 9 illustrates prioritized searching in accordance with an embodiment of the present invention.

[33] duration elapsed between the time when the email was received and the present time (when user is viewing the GUI)
[34] Different duration parameters can be set for read messages and unread messages. User may select only one option "read" or "unread"
[35] duration elapsed between the time when the email was received and the present time (when user is viewing the GUI)
[36] Different duration parameters can be set for read messages and unread messages. User may select only one option "read" or "unread"

e) Archiving & Search (FIGS. 8 and 9)

Prioritized Archiving (FIG. 8)

In another embodiment, email designated as "Completed," and the email that move out of the prioritized view after they are older by certain number of days (e.g. Medium priority email will move out of the Medium Folder View after 7 days, refer Table 4) will automatically move to a prioritized email archiving system. Since each of the email has its prioritization score and prioritization category information attached to it, each of the archived category email can be given a separate archiving treatment. For instance, High and Medium Priority email can be stored on a readily available media such as disk space for duration of 15 years or more, where as low priority or someday priority email be stored on cheaper/less readily available media storage such as tape media for 3 Years or less. According to our research, 20-40% of the archiving and storage space can be saved by separating and eliminating low & someday priority email (this does not include junk and spam email).

Prioritized Search (FIG. 9)

Since each of the email has its prioritization score and prioritization category information attached to it, those skilled in the art will appreciate the application of this information in improving the search results of both the archived email as well as from the email that are in the mail box. Upon executing a search by a user, the systems will first search among Very High and High Priority Email (including Defer, Completed, To-Do), followed by Medium Priority, followed by Low Priority, followed by Someday Priority. Moreover, the search results will be presented in a prioritized view with high priority email at the top followed by medium, low and someday priority email. Each category may be further sorted by date and time (for instance recent high priority email will be at the top, followed by older email).

B.3. User Feedback Gathering on Dynamically Prioritized Mail View a) Changing Dynamic Priority with a Single Click A user can change the priority score and/or category of an email(s) with a single click of a button. For example, to increase the Priority of an email from High to Very High, he/she can select an email (shown in FIG. 10) or group of email, and then click on the Very High (Red Flag button on the C-Mail Toolbar) priority button. Those in the art will appreciate that the same functionality can be achieved by right click contextual menu, keyboard stroke, or by dragging and dropping an email from one category to the desired priority category. And of course, the opposite can be done as well, changing an email(s) from a higher to lower priority. Once user performs this action, the system provides the feedback to the dynamic prioritization engine, which accordingly calculates a new score called "User Defined Score," however the system will remember the original score called "System calculated Score". The dynamic prioritization engine uses this feedback to more accurately calculate the system prioritization score of new email (incoming or outgoing), automatically reprioritize unread existing email or if a user desires recalculate the score of all the existing email over a give period (by selecting email and clicking on "Re-Score" button).

Figure 10:
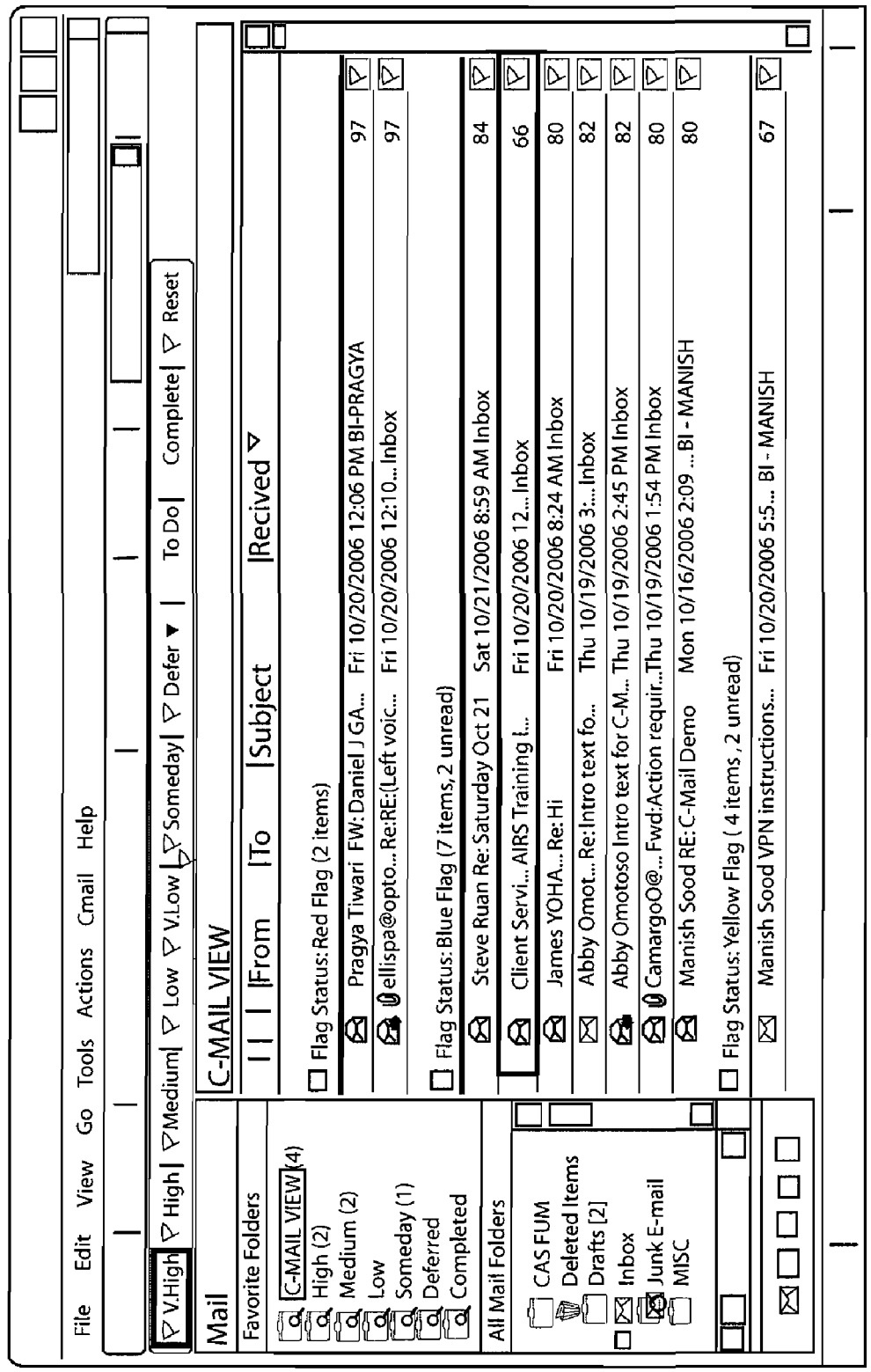
FIG. 10 illustrates changing prioritization score and category in accordance with an embodiment of the present invention.

In another embodiment "User Defined Score" takes precedence over "System Calculated Score," however the email (or group of email) can be brought back to System Calculated score/priority by using a "Reset" function ("Reset button shown on the toolbar in FIG. 10).

b) Setting Keywords and Contacts Priority

Figure 11A:
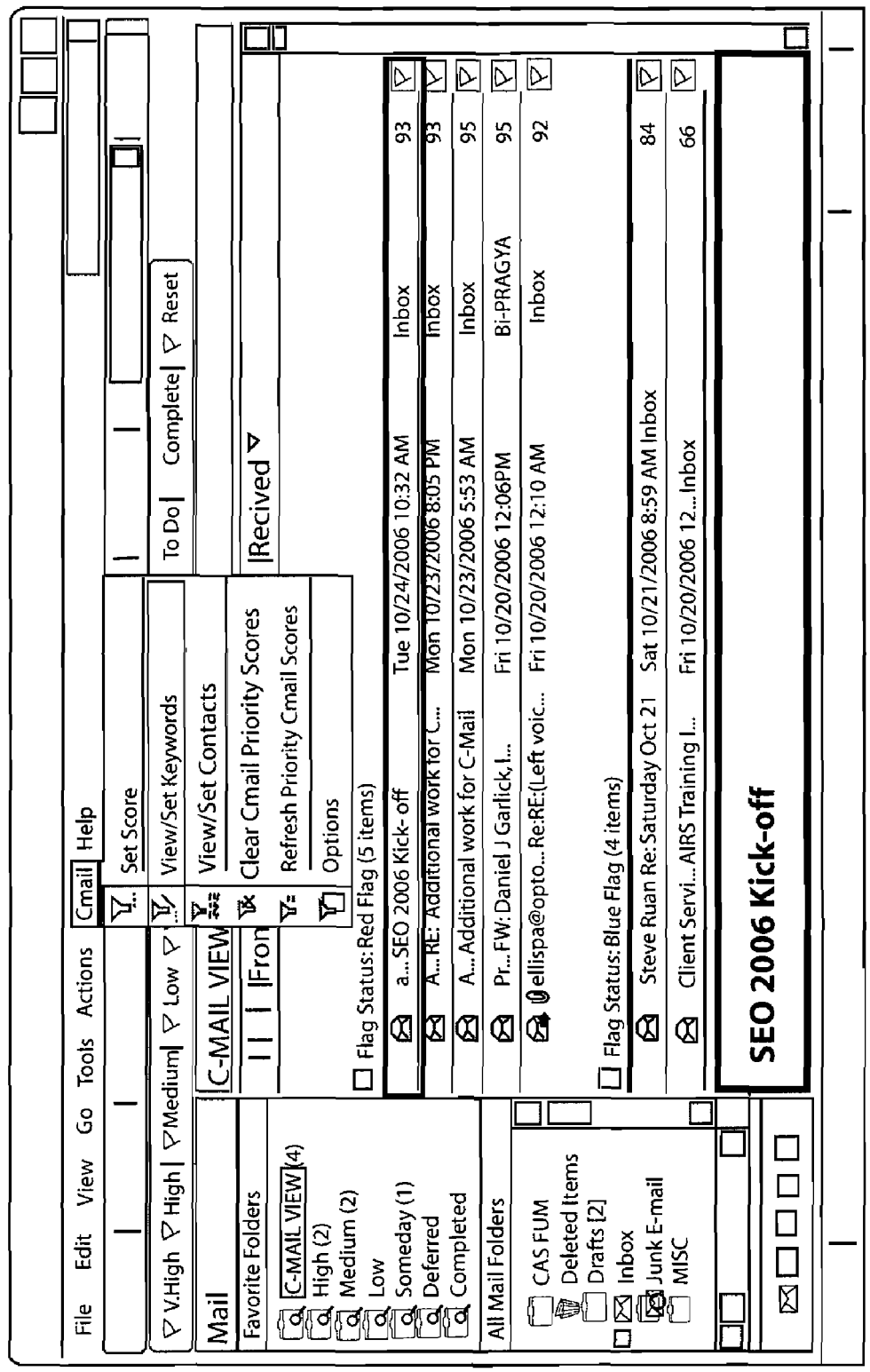
FIG. 11a illustrates setting keywords in accordance with an embodiment of the present invention.
Figure 11B:
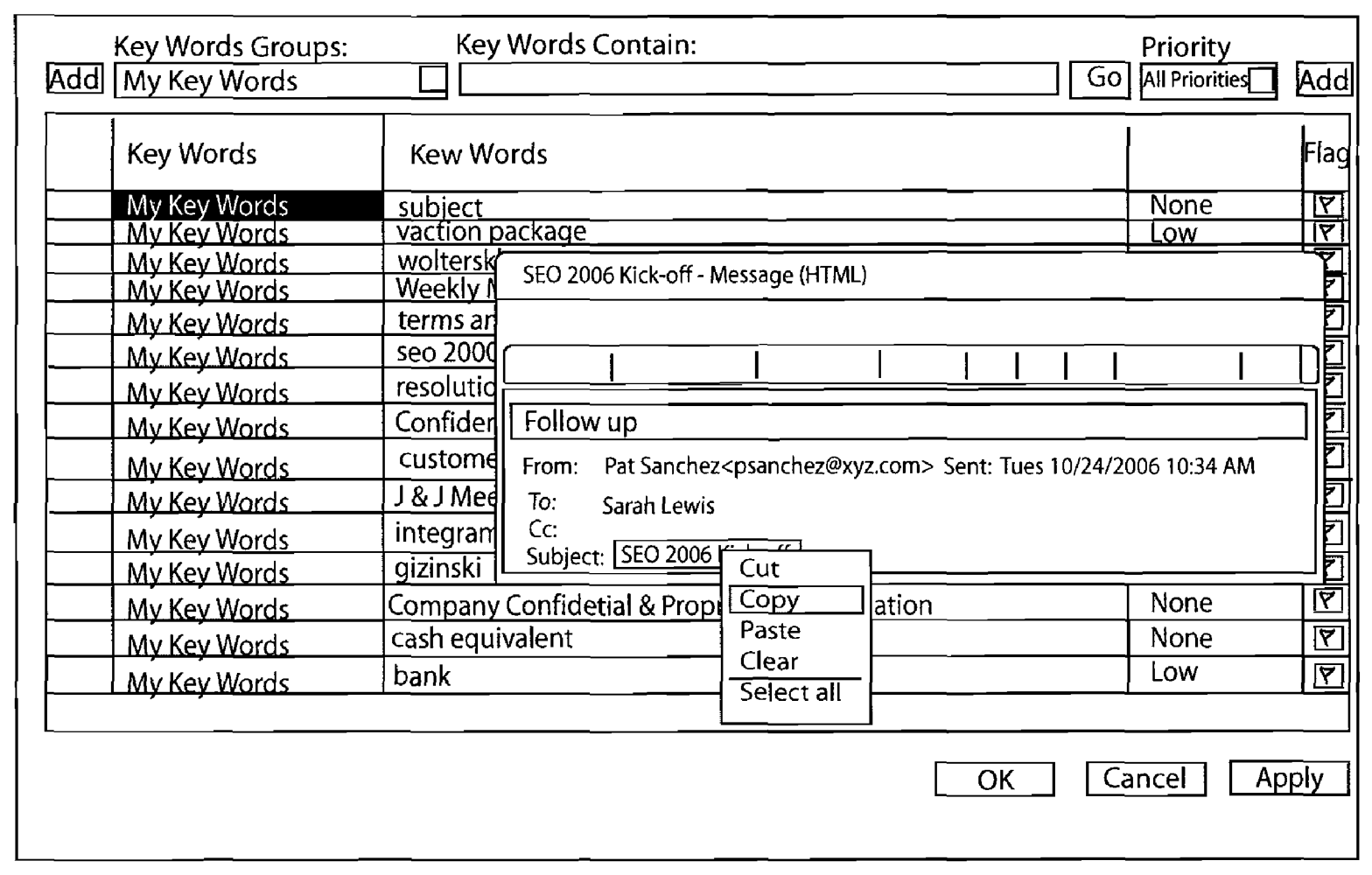
Figure 11D:
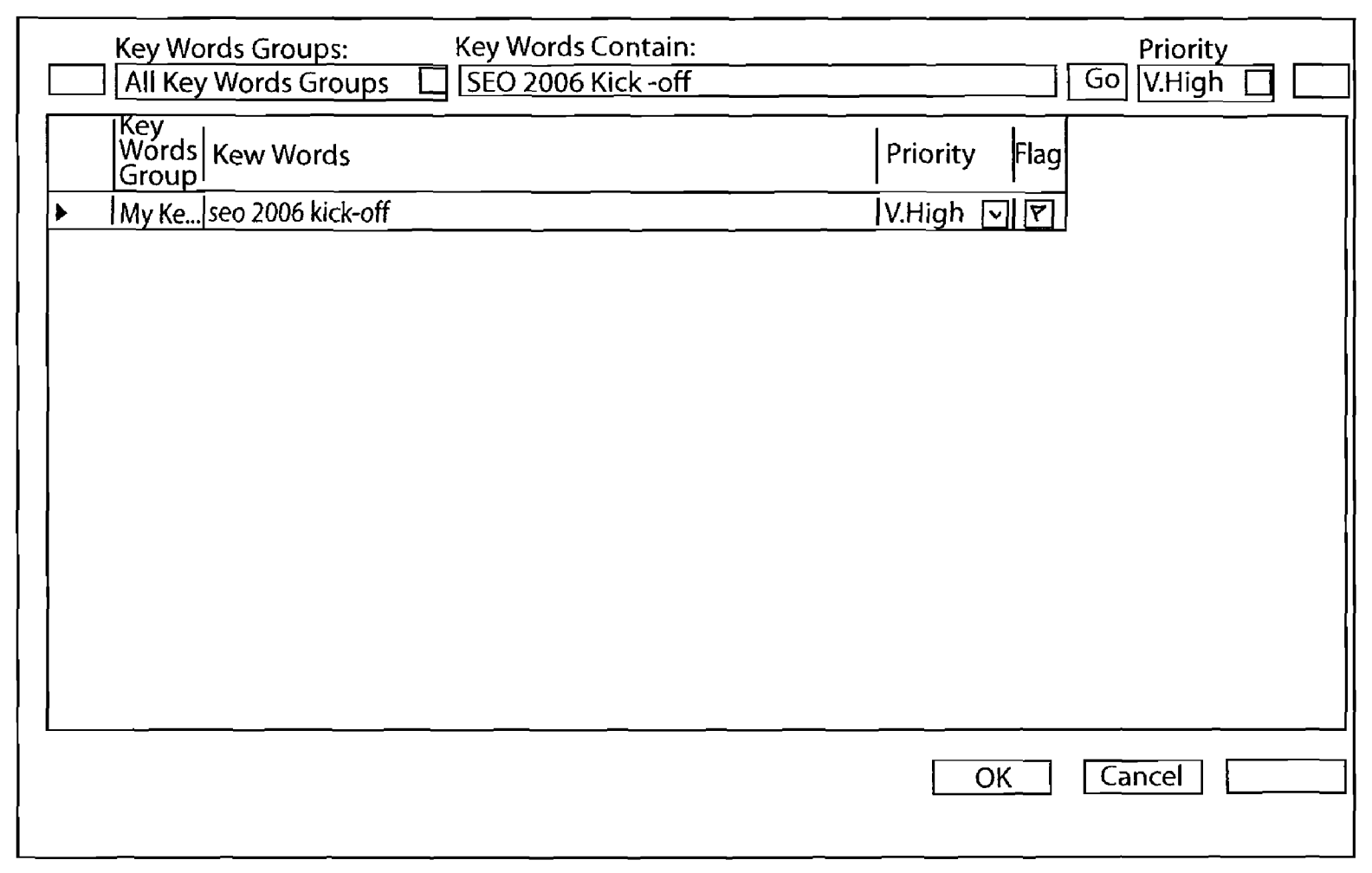
Figure 11E:
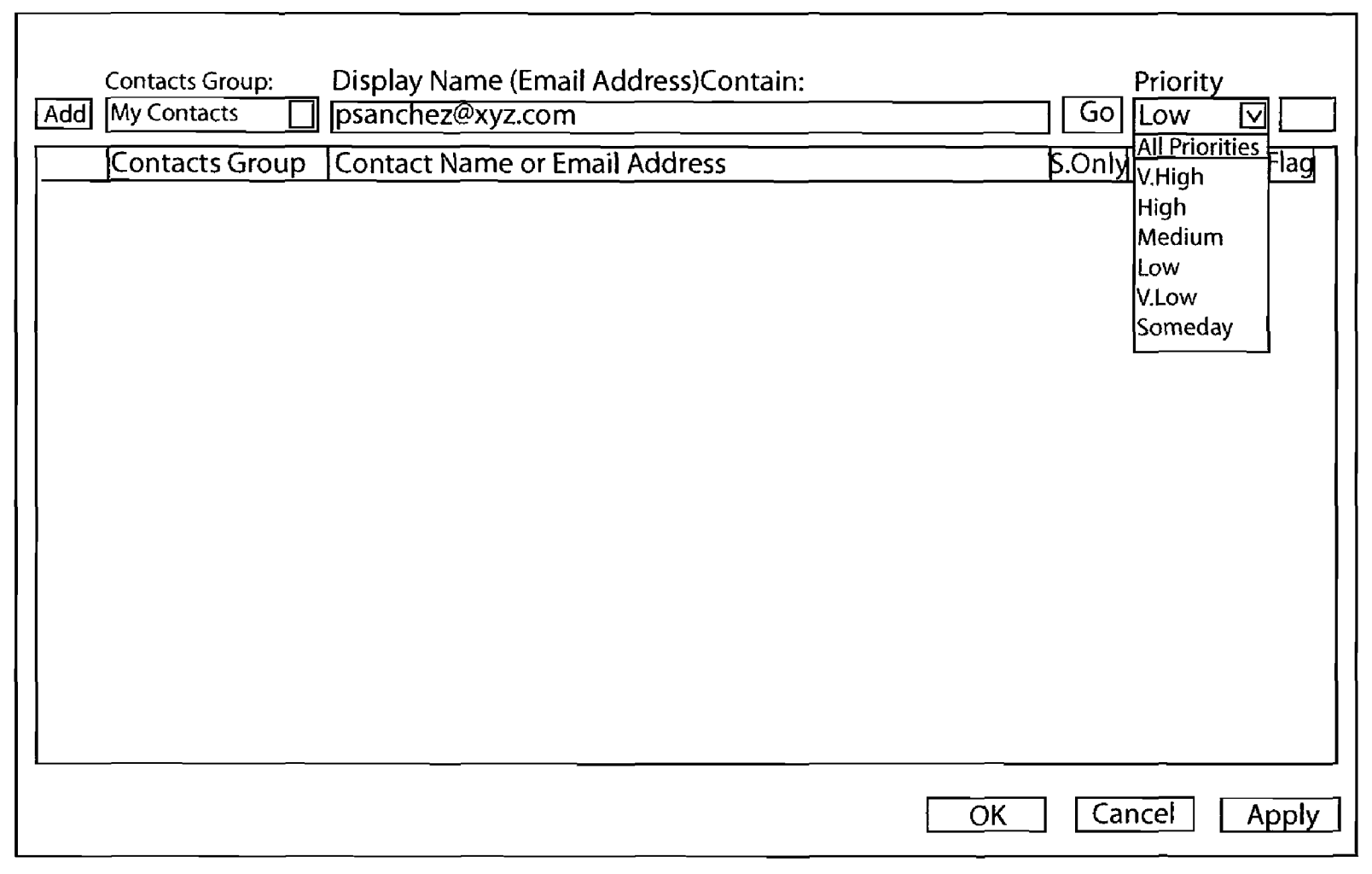

For example, in a situation where a user has just returned from a meeting and a new project has just been launched that will be very high priority for him. In this case, the user would like any email containing the name of this project to be "High Priority." In one embodiment of the present invention, users may provide the name or other keywords of the project, set the priority of each of those keywords (Refer FIG. 11 a, b, c and d). This input feedback is provided to the dynamic prioritized engine and it accordingly adjusts its content filters to more accurately calculate the system core of new email or the select existing email (using "Re-Score" functionality).

Similarly, a user can also specify the priority for contacts (FIG. 11e and 11f) by selecting View/Set Contacts, entering the email address of the contact, and selecting the desired priority or change the priority of existing contacts. In one of the embodiments, "Priority Lock" functionality for a given sender(s) may be invoked by simply checking the box next to the Contact Priority (refer FIG. 11f). The "Lock functionality" will cause the contact priority filter to override all the other prioritization filters while calculating the priority score of any email sent by the given sender. In other words, if the given sender's priority is locked at "Very High," any email received from that sender will always be scored Very High. Similarly, if a sender is locked at "Low Priority," any email received form that sender will be always be scored "Low Priority." Those skilled in the art will appreciate that same functionality can be achieved by selecting or highlighting a key word or contact with an email application or any other software application user is using, and the feedback input can be provided by right click contextual menu or with a key board stroke. Also, different level of access control may be provided on adding or changing the priority levels of "key words" or "contacts." For instance there may be different hierarchy of keywords and contacts such as corporate level, division level, department level, team level, individual level etc and a user may have one or more of the read, update, add and delete rights depending upon the user's job position. For example, a company management can mandate that any email coming from a customer Email Address is High Priority, and say a delivery clerk who using the system cannot change the priority category of any client contacts.

In another embodiment, the individual's keywords and contacts priorities are grouped together in a "company database," and the content is displayed in various business intelligence reports. The company's senior management reviews the keywords, makes any changes if necessary and approves the keywords and contact priorities, which are universally applied across to all the users and their individual keywords and contacts are updated accordingly.

C) System and Method of Measuring Email Productivity and Collaboration Trends and Displaying Results Thereof C.1 Existing Art Email Productivity & Collaboration Trends The existing art lacks quantitative metrics and reporting to measure email productivity level and collaboration trends of a user or group.

The existing art is unable to analyze and resolve the fact that each user has different email processing habits, and hence metrics of one user can be different from another user but their productivity levels may still be the same. Moreover, email metrics of a user may change widely over a period of time due to a number of external factors such as away in meetings, time-off from work, change in the work load, number of people the user is interacting with and the email habits of those people, etc.

The present invention addresses one or more of these concerns by providing a single productivity metric that takes these variations into consideration and by providing various reports that depict the productivity levels and collaboration trends.

C2 Explanation of Email Productivity Measurement & Collaboration Trends

One embodiment of the invention can be described as automatically gathering user's events (clicking data) in the background as the user works on his/her prioritized email, analyzing the events with respect to the priority score of the respective email user decided to process and other unprocessed email remaining in the mailbox, calculating productivity score on a scale of 0 to 100 (100 being the highest productivity score) for each of the email, and presenting various reports correlating email productivity score and email prioritization score over a given period of time and other parameters (such as number of users or departments, particular email thread or keywords, incoming or sent email or both types of communication, etc).

Figure 12:
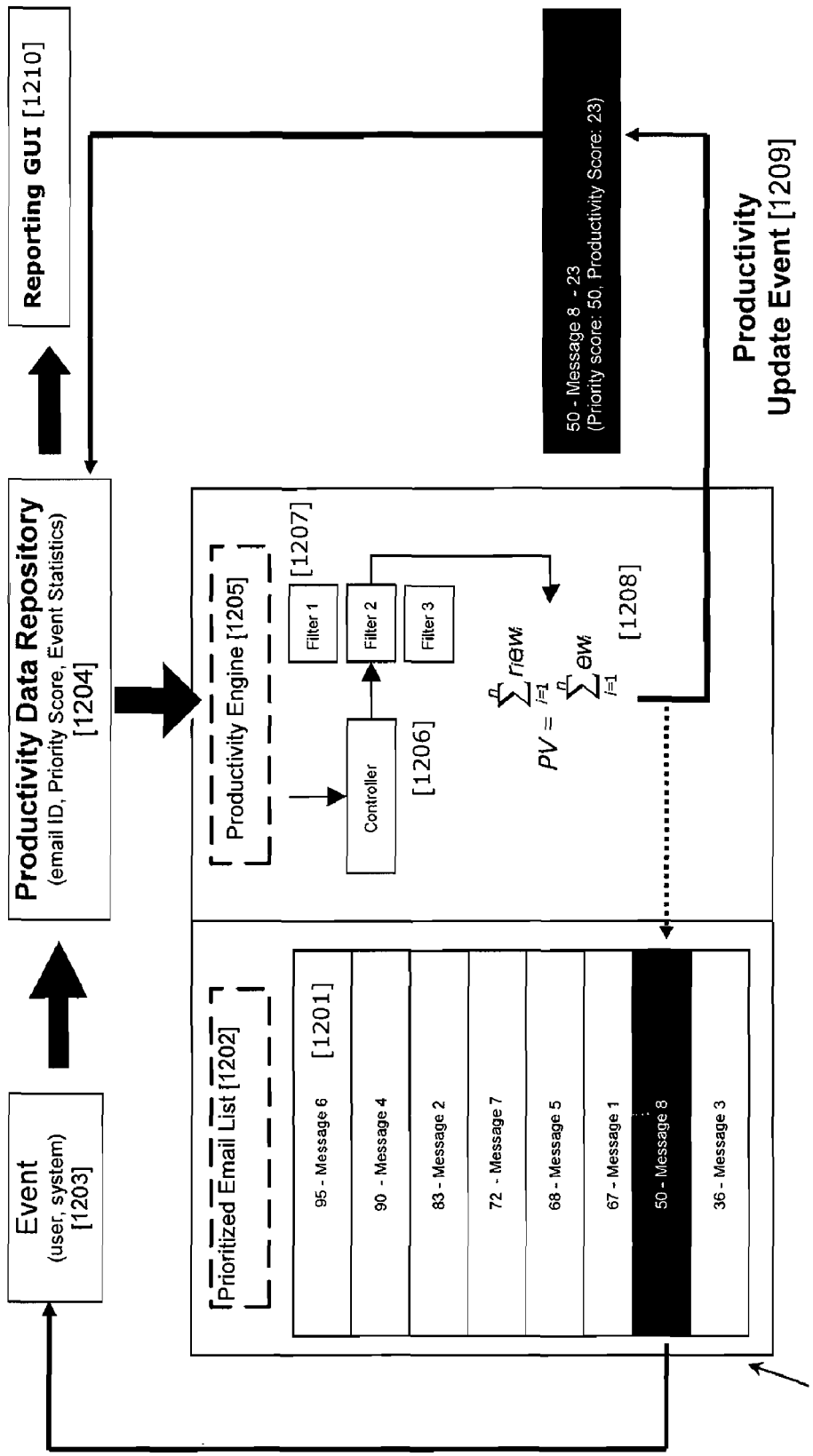
FIG. 12 illustrates email productivity measurement & trend analysis in accordance with an embodiment of the present invention.

C.2.1) Productivity Measurement & Trends Analysis Process (FIG. 12)

The productivity measurement process (FIG. 12) is triggered by user or system event(s) [1203] on dynamically prioritized message(s) [1202]. The user event may include taking action on email such reading, replying, initiating new email, deleting, filing, or any sort of decision-making (To-Do, Defer, Complete). The system event may include dynamic prioritization or reprioritization (re-scoring, reset, etc), system archiving or system deleting. The prioritization system and method is described in U.S. Non-Provisional application Ser. No. 11/144,428 filed Jun. 3, 2005, titled "System and Method for Dynamic Adaptive User-based Prioritization and Display of Electronic Messages." An email message represented by a unique identifier [1201] is given as an input to the Productivity Engine [1205]. This input comprises of various statistics including the Prioritization Score, User Action or Systems Events that are stored in a Productivity Data Repository [1204]. Statistics retrieved by the controller [1206] are then input to a set of filters [1207] that will compute productivity values based on different aspects of the message and the corresponding user action (or system event). The filters return different values that the system computes through a function (FIG. 12, FIG. 6a), calculating a single value as a result (using a weighted average in the current implementation). This result is the Overall Productivity Score [1208] of each of the respective messages. Once the process of productivity measurement finishes, the productivity engine sends an update event [1209] to the Productivity Data Repository [1204] in order to refresh the Reporting GUI [1210] or execute any other related action in the Prioritized List of Messages [1202].

C.2.2) Conceptual Embodiments a) Email Productivity Defined

An email user, especially a busy email user, at any given time may have multiple unprocessed messages in the mailbox. The unprocessed messages for instance, may include new messages in the mailbox which the user would like to read through, or the messages which need to be replied by the user, or the messages which require some sort of action-taking, etc. As a practical matter, user cannot be expected to process each message as soon as it comes in on a 24 hours basis. Let's say, the user gets an opportunity to check his mailbox and process messages when he/she started work in the morning, or say in between the meetings. Now it may be user's decision in regards to which email he selects to work at that particular instant of time, out of all the unprocessed email available to the user at the same instant of time.

According to one embodiment of the present invention, the system assigns a productivity score of 100 (highest productivity score on a scale of 0 to 100) if the user worked on the highest priority email out of all the unprocessed email available at that time (assuming there are lower priority unprocessed email which the user could have processed). The productivity score is attached to the email ID (of the email which user decided to process) and is stored in a productivity data repository.

Conversely, the system assigns a productivity score of 0 (lowest productivity score on a scale of 0 to 100) if the user worked on the lowest priority email out of all the unprocessed email at that time (assuming there are higher priority unprocessed email which the user could have processed).

In another embodiment, productivity score is calculated only when the user processes an email, referred to as "User initiated event" or "User event".

In another embodiment, "System initiated event" or "System event" trigger the system to calculate productivity score of the email which are being processed by the "System". The "System events" include but are not limited to automatic rules setup in the messaging systems such as automatic email folder management, auto email deletion, auto email reply, auto email archiving, etc.

Therefore, the email productivity (at a given time) is the efficiency and effectiveness of working on email in the decreasing order of its priority score. Accordingly, the productivity is a function of efficiency and effectiveness according to the following:

$$\text{function}(\text{Email Productivity})_T = \text{function}(\text{working on email in decreasing order of email priority})_T$$

where T=Time duration over which the productivity is measured b) Selecting Time Reference for Measuring Productivity Metrics In one embodiment the various "references", and the "type of reference" is applicable to accurately measure a given productivity metric.

To further describe the embodiment, Tables 11-14 depict a hypothetical user's email usage and metrics.

TABLE 11

Sample Size: Email Received from 6:15 to 10:05 hours,
Sample Metric Measurements taken at 15:36

| Email ID | Priority | Received Time HH:MM (a) | Read Time HH:MM (b) | Reply Time HH:MM (c) | Time Gap between Read & Received (d) = (b) − (a) | Time Gap Between Reply and Received (e) = (c) − (a) |
|---|---|---|---|---|---|---|
| 1 | Someday | 6:15 | 9:59 | 13:31 | 3:44 | 7:16 |
| 2 | Med | 8:30 | Unread | Not Replied | | |
| 3 | Med | 8:35 | 9:55 | 10:05 | 1:20 | 1:30 |
| 4 | High | 9:15 | 9:35 | 10:31 | 0:20 | 1:16 |
| 5 | Low | 9:30 | 9:58 | Not Replied | 0:28 | |
| 6 | Med | 9:35 | Unread | Not Replied | | |
| 7 | Low | 9:45 | Unread | Not Replied | | |
| 8 | Very High | 10:05 | 14:05 | 15:35 | 4:00 | 5:30 |

TABLE 12

RECEIVED Reference: Measurement of metrics
Time: 9:00 am to 10:00 am

| Priority | # of email Received | # of Email Read | # of email Replied | Avg Time to Read | Avg Time to Reply |
|---|---|---|---|---|---|
| Very High | 0 | 0 | 0 | | |
| High | 1 | 1 | 1 | 00:20 | 01:16 |
| Medium | 1 | 0 | 0 | | |
| Low | 2 | 1 | 0 | 00:28 | |
| Very Low | 0 | 0 | 0 | | |
| Someday | 0 | 0 | 0 | | |
| Total/ Weighted Average | 4 | 2 | 1 | 0:24 | 01:16 |

TABLE 13

READ Reference: Measurement of metrics Time: 9:00 am to 10:00 am

| Priority | # of email Received | # of Email Read | # of email Replied | Weighted Avg Time to Read | Avg Time to Reply |
|---|---|---|---|---|---|
| Very High | 0 | 0 | 0 | | |
| High | 1 | 1 | 1 | 00:20 | 01:16 |
| Medium | 0 | 1 | 1 | 01:20 | 01:30 |
| Low | 1 | 1 | 0 | 00:28 | |
| Very Low | 0 | 0 | 0 | | |
| Someday | 0 | 1 | 1 | 3:44 | 07:16 |
| Total/ Weighted Average | 2 | 4 | 3 | 1:28 | 03:20 |

TABLE 14

REPLY Reference: Measurement of metrics
Time: 9:00 am to 10:00 am

| Priority | # of email Received | # of Email Read | # of email Replied | Weighted Avg Time to Read | Avg Time to Reply |
|---|---|---|---|---|---|
| Very High | 0 | 0 | 0 | N/A | N/A |
| High | 0 | 0 | 0 | N/A | N/A |
| Medium | 0 | 0 | 0 | N/A | N/A |
| Low | 0 | 0 | 0 | N/A | N/A |
| Very Low | 0 | 0 | 0 | N/A | N/A |

TABLE 14-continued

REPLY Reference: Measurement of metrics
Time: 9:00 am to 10:00 am

| Priority | # of email Received | # of Email Read | # of email Replied | Weighted Avg Time to Read | Avg Time to Reply |
|---|---|---|---|---|---|
| Someday | 0 | 0 | 0 | N/A | N/A |
| Total/ Weighted Average | 0 | 0 | 0 | No Value | No Value |

The above example illustrates the following embodiments:

1. Measurement of a Productivity Metric may be different based on which type of Reference is selected for the measurement.

2. The measurement of a Metric over the same Reference may change over a period of time. For example considering the Table: READ Reference, let's say the measurement of Number of Email READ is 4 emails at the time measurement was taken. By way of example, a few minutes after the observation was taken say at 15:40 pm user reads another email (say email received at 9:35 pm). Therefore, even with the sample size and the same reference (READ Reference) the measurement of the same metric (Email Read) has changes to 5 from an earlier value of 4.

3. The following embodiment is envisioned to remove the above mentioned variations in the measurement and inter-relationships of various metrics: Each Metric should use its own frame of time reference for measurement, in other words Email Received Metrics measurement must use Email Received reference, Email Read Metrics measurement must use Email Read Reference, and Email Replied (or new email composed and Sent) must use Email Reply Reference. This type of metric measurement is referred to as the "Absolute Frame of Reference". In the productivity measurement embodiments disclosed in this application, "Absolute frame of reference" is assumed by default unless mentioned separately.

4. Now considering the same example above and using Absolute Time Reference, the following measurements could be recorded and analyzed for productivity scoring and collaboration trends purposes:

TABLE 15

ABSOLUTE Time Reference: Measurement of metrics Time: 9:00 am to 10:00 am

| Priority | # of email Received (based on Recd time reference) | # of Email Read (based on Read Time Reference) | # of email Replied (based on Reply time reference) | Weighted Avg Time to Read (based on Read Time Reference) | Avg Time to Reply (based on Reply Time Reference) |
|---|---|---|---|---|---|
| Very High | 0 | 0 | 0 |  | N/A |
| High | 1 | 1 | 0 | 00:20 | N/A |
| Medium | 1 | 1 | 0 | 01:20 | N/A |
| Low | 2 | 1 | 0 | 00:28 | N/A |
| Very Low | 0 | 0 | 0 |  | N/A |
| Someday | 0 | 1 | 0 | 3:44 | N/A |
| Total/Weighted Average | 4 | 4 | 0 | 1:28 | No Value | c) Email Productivity Metrics & Collaboration Trends

The Email Productivity metrics comprise of one or more of the three components, namely: a) Decision-making Metrics, b) Processing Metrics, and c) Communication Metrics. Each metric may be measured across two dimensions: "time or efficiency" dimensions (faster work), and "Quantity or effectiveness" dimension (amount of work done in a given duration).

Decision-Making Metrics

Decision-making metrics measure the efficiency and effectiveness of user's decision-taking on the actionable email. Within the context of disclosed invention, this may include identifying actionable email (from received or sent messages), converting the actionable email to action, plan action, and completing action. These metrics may be the most important metrics for a busy user or a productive organization, and hence may carry the maximum weight. However, the accurate measurement of decision-making metrics is contingent on the users agreeing to follow workflow rules described in the invention such as designating actionable email to "To-Do" and "Defer" and mark them "Complete" as soon as the action is completed. Another embodiment involves that "Very High/Red Flag Priority Level" is automatically considered as an action item ("To-Do"). These metrics also help measure collaboration trends in terms of what information (from the external world) is considered actionable, and relatively how fast, the decision-making is performed by the recipient. The disclosed invention helps measure, and increase the efficiency and effectiveness of Decision-making Metrics.

Processing Metrics

Processing metrics measure the efficiency and effectiveness of user's reading of email received in the mailbox, and the manual housekeeping operations performed by the user. The objective of these metrics is to provide information on how much and what % of user's time is spent towards reading important messages, and whether the more important messages are read before the less important messages. These metrics also help measure collaboration trends in terms of what information received (from external world) is considered relatively important by the recipient, and relatively how fast that information is processed by the recipient. The housekeeping metrics gauge the amount of efforts user spent in manually archiving, filing, deleting, searching his/her older email. In an ideal situation, most of the routine house-keeping should be taken care automatically thus saving time for the user. The disclosed invention helps measure, and increase the efficiency and effectiveness of Processing Metrics.

Communication Metrics

Communication metrics measure the efficiency and effectiveness of the user's communication with the external world. The objective of these metrics is to provide information on how much and what % of the user's time is spent towards replying to important messages, and whether the more important messages are replied to before the less important messages. These metrics also help measure the collaboration trends, which is the amount, speed and relative importance of new information the user is generating and sends to others. For instance, the metrics measure the number of new email thread initiated by the user, and back and forth communication on the same thread (too much back and forth communication on the same thread within a short amount of time may be an indicator of lower communication productivity). The inventions disclosed here help measure, and increase the efficiency and effectiveness of Communication Metrics.

One or more of the above embodiments may be summarized in the following Table 16.

TABLE 16

Email Productivity Metrics

| Components of Email Productivity | Sample Metrics | Quantity Dimension (Quantity, Relative %) | Time Dimension (Absolute Time, Relative Relationship) | Comments |
|---|---|---|---|---|
| I. Decision-Making | Actions Planned (To-Do, Defer, Very High Priority | Number of messages marked for "To-Do" Number of Very High Priority | Time to plan an action Time to Complete an action | The accurate measurements of these metrics |

TABLE 16-continued

Email Productivity Metrics

| Components of Email Productivity | Sample Metrics | Quantity Dimension (Quantity, Relative %) | Time Dimension (Absolute Time, Relative Relationship) | Comments |
|---|---|---|---|---|
| | Messages) Action Completed (Completed) | Messages also considered as "To-Do" Number of messages became "To-Do" from "Defer" Number of messages marked as "Complete" % of "To-Do" and "Complete" | | require a user to follow simple work-flow rules provided in the prioritized GUI embodiment. |
| II. Processing | Email Received Email Read House-keeping of Mailbox (deleted, archived, filed in the folders, search, knowledge mgt) | Number of Messages Read Number of Messages Received % of Read and Received Number of messages user manually deleted, archived, filed in folders or stored for knowledge management, searched | Time gap between email received and email read (Time to Read) Total time user spent in reading each message Total time user spent in the manual housekeeping operations | These metrics are automatically collected and recorded based on the user's clicking behavior on the prioritized GUI and stored in the productivity data repository |
| III. Communication | Email Replied New Email Sent Communication on the same thread . . . | Number of messages replied Number of new email composed and sent Number of email sent on the same thread within a short time duration | Time gap between email replied and email received (Time to Reply) Total time user spent in email replying and sending | These metrics are automatically collected and recorded based on the user's clicking behavior on the prioritized GUI and stored in the productivity data repository |

C.2.3) Productivity Algorithms
Calculating Decision Making Productivity Score ($R_D$)

$$R_{D\,0\,to\,100} = \text{function}(S_{D\,0\,to\,1}, M_{D\,0\,to\,1}) \times 100$$

Where:
Effectiveness ($S_D$, Value Ranges from 0 to 1)

$S_D$ takes into account the "Quantity or Effectiveness" dimension of the decision-making productivity. For instance, the email decision making productivity will be 100 (on a scale of 1 to 100, with 100 being the highest productivity) if the user "Completes" the action on the highest priority "To-Do" email available at that instant of time (assuming there are lower priority "To-Do" email action items in the mailbox). Conversely, the email decision-making productivity will be the lowest if the user "Completes" action on the lowest priority "To-Do" email available at that time (assuming there are higher priority "To-Do" email action items in the mailbox).

$$S_{D0\,to\,1} = \frac{\left[\sum_{p>n}^{6}(\text{Number of email COMPLETE})\right]}{\left[\sum_{p>n}^{6}(\text{Number of email for TO-DO})\right]} \times$$

$$\frac{\left[\sum_{p=n}^{n}(\text{Number of email COMPLETE})\right]}{\left[\sum_{p=n}^{n}(\text{Number of email for TO-DO})\right]}$$

Where:
"n" is the Priority Category of the Email which user set to "COMPLETE" at time T2;
"p" is the Priority Category Value being defined as: Very High=6, High=5, Medium=4, Low=3, Very Low=2, Someday=1;
"Σ (number of email COMPLETE)" is the cumulative number of email set to COMPLETE in duration "T";
"Σ (number of email TO-DO)" is the cumulative number of email which are set to TO-DO in duration "T"; and
"T"=Duration (T2–T1), T2 being the instant of time when user marked the given email to COMPLETE. T1 is considered to be 30 working days assuming that if a user is overdue for taking action on a "To-Do" email for more than 30 days (or has not "Defer" the email it to another duration in 30 days) the action item is not a priority to the user. For example, if user "Completed" a High Priority Email at 4:00:01 pm on Oct. 30, 2007 (T2), the T in this case will be the duration 4:00:01 pm on October 30 to 4:00:01 pm on Sep. 19, 2007 (30 working days, excluding weekends, assuming user has been working during all the weekdays in this duration).

Efficiency ($M_D$, Value Ranges from 0 to 1)

$M_D$ takes into account the "Time or Efficiency" dimension of the email decision-making productivity. For instance, if the "Time to Complete" (time gap between email receipt and email Completed) of a given email that user Completed is "equal to" or "shorter than" the "average time to Complete for the corresponding particular priority category", the read productivity will be 100 (on a scale of 1 to 100, with 100 being the highest productivity). However, if a user took longer time than the "average time to Complete" for that category, the productivity will decrease.

Another invention embodiment includes measurement of MD based on the comparing the "Time to Complete" for the given email with one of more of the following: "Company or Group Standard Benchmark Time to Complete", "Average Time to Reply for the corresponding Priority Category". Those proficient in the art will appreciate that depending upon the sample size, duration and deviations, other statistical tools such as median, standard deviation, and weighted average analysis may be used for increasing the accuracy of the statistical results.

$M_D = \text{function}[t_D/t_{D\,avg.}]$

If $M_D < 1$, then $M_D = 1$
If $M_D = 1$, then $M_D = 1$
If $1 < M_D <$ or $= 2$, then $M_D = 0.75$
If $2 < M_D <$ or $= 4$, then $M_D = 0.50$
If $4 < M_D <$ or $= 8$, then $M_D = 0.25$
If $8 < M_D <$ or $= 16$, then $M_D = 0.125$
... and the series continues ....

Where:

"$t_D$" is the "Actual Time to Complete" the email. The frame of time "$t_D$" reference will change based on the following conditions;

If email marked "To-Do" is "Completed" then t=time gap between email "Received" and "Completed"

If email is "Very High Category" AND is NOT marked as "To-Do" AND is marked "Completed", t=time gap between email "Received" and "Completed";

If email is "any category other than Very High Category" AND is NOT marked as "To-Do" AND is marked "Complete", the event is ignored for measuring decision making productivity. If email is marked to "Defer" to a Set Time, and at that Set Time, the email becomes "To-Do", then t=time gap between when email became "To-Do" and it is "Completed".

"$t_{D\,avg.}$" is the Overall Average Time to Complete based on <T1> Duration (a representative sample of <T1> duration is considered 30 working days) for the corresponding Priority Category. Another embodiment includes measuring the overall average Time to Complete based on one or more of the following: last 3 months moving average for the given priority category, last 3 months moving average of all the email Completed by user, company or group average or set benchmarks, etc.

"T1" is the number of days a given priority level email is kept in the respective Prioritized View Folder.

Example

Calculating Email Decision-Making Productivity Score ($R_D$)

TABLE 17

| | User's state of data (just before time T1) | | | |
|---|---|---|---|---|
| Priority Category | Category Value "p" | Cumulative number of "Complete" email in latest <30> working days | Cumulative number of "TO-Do" Email in latest <30> working days | Overall "Average Time to Complete" for the category** |
| Very High* | 6 | 7* | 10 | 5 hours |
| High | 5 | 4 | 10 | 10 hours |
| Medium | 4 | 4 | 10 | 15 hours |
| Low | 3 | 3 | 10 | 20 hours |
| Very Low | 2 | 2 | 10 | 25 hours |
| Someday | 1 | 1 | 10 | 30 hours |

*any email with Very High Priority category is automatically considered as a "To-Do" item.
**as an example say based on the last 3-months moving average of "Time to Complete."

In yet another embodiment, if a user decides to take action and "Complete" a "Medium Priority To-Do" email, and assuming that there is no new email marked as "To-Do" (or any new "High Priority" email received), once the user 'Completes' a Medium Priority category, number of email Completed in Medium Priority will be =4+1=5, The number of "To-Do" email in the Medium Priority is still 10. The Decision Making Productivity Score (for that particular email ID) will be calculated as below:

In this case, n=4 (because email "Completed" belongs to Medium Priority Category);
Cumulative Number of email "Completed" in the category above Medium Priority, (Σp=5 to 6)=4+7=11
Cumulative Number of email "To-Do" in the category above Medium Category, (Σp=5 to 6)=10+10=20
Cumulative Number of email "Completed" in the Medium Priority Category (Σp=4 to 4)=4+1=5
Cumulative Number of email "To-Do" in the Medium Priority Category (Σp=4 to 4)=10

$S_D = [11/20] \times [5/10] = 0.27$

By way of example, suppose that "Time to Complete" for the given email was 20 hours Therefore:

$M_D = [20/15] = 1.33$, If $1 < M_D <$ or $= 2$, then $M_D = 0.75$

Therefore:

Decision-making Productivity Score=$[0.27] \times [0.75] \times 100 = 20.62$ a) Calculating Processing Productivity Score ($R_P$)

$R_{P\,0\,to\,100} = \text{function}(S_{P\,0\,to\,1}, M_{P\,0\,to\,1}) \times 100$ Where:

Effectiveness ($S_P$, Value Ranges from 0 to 1)

$S_P$ takes into account the "Quantity or Effectiveness" dimension of the email processing. For instance, the email reading productivity will be 100 (on a scale of 1 to 100, with 100 being the highest productivity) if the user reads the highest priority unread email available at that instant of time (assuming there are lower priority unread email). The email reading effectiveness will be 0 for if the user reads the lowest priority unread email available at that time (assuming there are higher priority unread email).

$$S_{P0\,to\,1} = \left[\frac{\left[\sum_{p>n}^{6}(\text{Number of email READ})\right]}{\left[\sum_{p>n}^{6}(\text{Number of email RECEIVED})\right]}\right] \times \left[\frac{\left[\sum_{p=n}^{n}(\text{Number of email READ})\right]}{\left[\sum_{p=n}^{n}(\text{Number of email RECEIVED})\right]}\right]$$

Where:

"n" is the Priority Category of the Email which user READ at time T2;

"p" is the Priority Category Value being defined as: Very High=6, High=5, Medium=4, Low=3, Very Low=2, Someday=1;

"Σ (Number of email READ)" is the cumulative number of email READ in duration "T";

"Σ (Number of email RECEIVED)" is the cumulative number of email RECEIVED in duration "T"; and "T"=Duration (T2−T1), T2 being the instant of time when user READ the given email. T1 is the number of days a given priority level email is kept in the respective Prioritized View Folder. For example, latest 7 days Blue Flag/High Priority email can be viewed in the "High" view folder. If a user reads a High Priority Email at 4:00:01 pm on October 12 (T2), the T in this case will be the duration 4:00:01 pm on October 12 to 4:00:01 pm on October 5.

Efficiency ($M_P$, Value Ranges from 0 to 1)

M takes into account the "Time or Efficiency" dimension of the email processing. For instance, if the "time to read" (time gap between email receipt and email read) of a particular email that user read is "equal to" or "shorter than" the "average time to read for that particular priority category", the read productivity will be 100 (on a scale of 1 to 100, with 100 being the highest productivity). However, if a user took longer time than the average time for that category, the productivity will decrease. Another invention embodiment includes measurement of $M_P$ based on the comparing the "Time to Read" for the given email with one of more of the following: "Company or Group Standard Benchmark Time to Read", "Overall Average Time to Read Email for the user based on last 3 months". Those proficient in the art will appreciate that depending upon the sample size, duration and deviations, other statistical tools such as median, standard deviation, and weighted average analysis may be used for increasing the accuracy of the statistical results.

$M_P$=function[$t_P/t_{P\,avg.}$]

If $M_P<1$, then $M_P=1$
If $M_P=1$, then $M_P=1$
If $1<M_P<$ or $=2$, then $M_P=0.75$
If $2<M_P<$ or $=4$, then $M_P=0.50$
If $4<M_P<$ or $=8$, then $M_P=0.25$
If $8<M_P<$ or $=16$, then $M_P=0.125$
... and the series continues ....

Where:

"$t_P$" is the "Actual Time to Read" the email;

"$t_{P\,avg.}$" is the Overall Average Time to Read based on T1 Duration (for example last 7 days for High Priority Category), for the corresponding Priority Category. Another embodiment includes measuring the overall average Time to Read based on one or more of the following: last 3 months moving average for the given priority category, last 3 months moving average of all the email read by user, company or group average or set benchmarks; and "T1" is the number of days, a given priority level email is kept in the respective Prioritized View Folder.

Example

Calculating Email Processing Productivity Score ($R_P$)

TABLE 18

User's state of data (just before time T1)

| Priority Category | Category Value "p" | Cumulative Read Email in latest <7>days* | Cumulative Received Email in latest <7> days* | Overall Average Time to Read** for the category |
|---|---|---|---|---|
| Very High | 6 | 90 | 100 | 5 hours |
| High | 5 | 79 | 100 | 10 hours |
| Medium | 4 | 40 | 100 | 15 hours |
| Low | 3 | 29 | 100 | 20 hours |
| Very Low | 2 | 20 | 100 | 25 hours |
| Someday | 1 | 10 | 100 | 30 hours |

*This assumes that the user's Prioritized GUI has been configured to display latest 7 days email for each priority category.
**as an example say based on the last 3-months moving average.

Scenario 1:

In a situation where a user decides to read an email in the "High Priority," and there is no new email received. Once the user reads a high priority category, number of email read in High Priority will be:

79+1=80

The number of email received in the High Priority is still 100. The Processing Productivity Score (for that particular email ID) will be calculated as below:

In this case, n=5 (because email read belongs to High Priority Category);

Cumulative Number of email Read in the category above High Priority, that is Very High Category (Σp=6 to 6)=90;

Cumulative Number of email Received in the category above High Category, that is Very High Category (Σp=6 to 6)=100;

Cumulative Number of email Read in the High Priority Category (Σp=5 to 5)=80;

Cumulative Number of email Received in the High Priority Category (Σp=5 to 5)=100;

$S_P$=[90/100]×[80/100]=0.72;

Assuming that "Time to Read" for the email that was read was 5 hours:

$M_P=[5/10]=0.5$. If $M_P<1$, then $M_P=1$;

Therefore, Processing Productivity Score=$[0.72]\times[1]\times 100=72$

Scenario 2:

In an alternative situation where a user decides to read an email in the "Very High Priority," and there is no new email received. Once the user reads a Very High priority category, the number of email read in High Priority will be: 90+1=91. The number of email received in the High Priority is still 100. The Processing Productivity Score (for that particular email ID) will be calculated as below:
In this case, n=6 (because email read belongs to Very High Priority Category);
Cumulative Number of email Read in the Very High Priority ($\Sigma$p=6 to 6)=91;
Cumulative Number of email Received in the Very High Category ($\Sigma$p=6 to 6)=100;
Cumulative Number of email Read in the Very High Priority Category ($\Sigma$p=6 to 6)=91;
Cumulative Number of email Received in the Very High Priority Category ($\Sigma$p=6 to 6)=100;

$S_P=[91/100]\times[91/100]=0.83$;

Assuming that "Time to Read" for the email that was read was 4 hours:

$M_P=[4/5]=0.8$. If $M_P<1$, then $M_P=1$;

Therefore, Processing Productivity Score=$[0.83]\times[1]\times 100=83$

Scenario 3

In yet another alternative situation where a user decides to read an email in the "Low Priority," and there is no new email received. Once the user reads a Low priority category, number of email read in Low Priority will be: 29+1=30. The number of email received in the Low Priority is still 100.
The Processing Productivity Score (for that particular email ID) will be calculated as below:
In this case, n=3 (because the email read belongs to Low Priority Category);
Cumulative Number of email Read in the Very High, High and Medium Priority ($\Sigma$p=4 to 6) 90+79+40=209;
Cumulative Number of email Received in the Very High Category ($\Sigma$p=4 to 6)=100+100+100=300;
Cumulative Number of email Read in the Low Priority Category ($\Sigma$p=3 to 3)=29+1=30;
Cumulative Number of email Received in the low Priority Category ($\Sigma$p=3 to 3)=100;

$S_P=[209/300]\times[30/100]=0.21$;

Assuming that "Time to Read" for the email that was read was 5 hours:

$M_P=[20/20]=1.0$. If $M_P<1$, then $M_P=1$;

Therefore, Processing Productivity Score=$[0.21]\times[1]\times 100=21$ c) Calculating Communication Productivity ($R_C$)

$R_{C\ 0\ to\ 100}=\text{function}(S_{C\ 0\ to\ 1}, M_{C\ 0\ to\ 1}, A_{C\ 0\ to\ 1})\times 100$ Effectiveness ($S_C$, value ranges from 0 to 100)

$S_C$ takes into account the importance of the sent email (including replied and new email thread initiated). For instance, the email communication productivity will be 100 (on a scale of 1 to 100, with 100 being the highest productivity) if the user is communicating very important email at that instant of time (assuming there are other lower priority email in the mailbox). The email communication productivity will be 0 for if the user is responding to the lowest priority email available at that time (assuming there are higher priority email which needs to be responded to).
If replied to an received email and user did not change the priority of sent email
  Then $S_C$=Priority Score of the corresponding Received Email (user customized score if user adjusted the score), which was replied to by the user
If replied to an received email and user changed the priority of sent email
  Then $S_C$=User updated Priority Score of the Sent Email (that is the priority score which was adjusted by the user)
If a new email is sent by the user (new thread initiated)
  Then $S_C$=Priority Score of the Sent Email (user customized score if user adjusted the score)
Efficiency ($M_C$, Value Ranges from 0 to 1)

M takes into account the "Time or Efficiency" dimension of the email communication. For instance, if the "time to reply" (time gap between email receipt and email replied) of a particular email that user replied is "equal to" or "shorter than" the "average time to reply for that particular priority category", the communication productivity will be 100 (on a scale of 1 to 100, with 100 being the highest productivity). However, if a user took longer time than the average time for that category, the productivity will decrease.

$M_C=\text{function}[t_C/t_{C\ avg.}]$

If $M_C<1$, then $M_C=1$
If $M_C=1$, then $M_C=1$
If $1<M_C<$ or $=2$, then $M_C=0.75$
If $2<M_C<$ or $=4$, then $M_C=0.50$
If $4<M_C<$ or $=8$, then $M_C=0.25$
If $8<M_C<$ or $=16$, then $M_C=0.125$
. . . and the series continues . . . .

Where:
"$t_C$" is the "Actual Time to Reply" the email; and
"$t_{C\ avg.}$" is the Overall Average Time to Reply for the corresponding Priority Category.
Same Email Thread Efficiency ($A_C$, Value Ranges from 0 to 1)

$A_C$ is the productivity of exchanging email on the same thread. The productivity will be highest when a meaningful conversation is going back and forth on a given email thread. Conversely, the productivity will be lower if the email communication is not helping the conversation, and therefore perhaps phone or in person meeting will be a better mode of communication.

$A_C$ value is calculated depending upon the "number of email sent on the same thread to the same sender" in a relatively short duration "$T_C$" hours. In most case "$T_C$" will be 1 to 2 hours.
Within duration "$T_C$" hours:
If number of Thread $<$ or $=3$, $A_C=1$
If $4<$ or $=$Number of Thread $<$ or $=5$, $A_C=0.75$
If $6<$ or $=$Number of Thread $<$ or $=7$, $A_C=0.50$
If $8<$ or $=$Number of Thread $<$ or $=9$, $A_C=0.25$
If $10<$ or $=$Number of Thread $<$ or $=11$, $A_C=0.25$
. . . and the series continues
d) Overall Productivity Score:
Therefore, Function(Overall Productivity Score)$_T$=function[function(Decision-making)$_T$,function(Processing)$_T$, function(Communication)$_T$]

T=Refers to the time duration for which the productivity is being measured

C.2.4) Implementation of Email Productivity and Collaboration Trends Measurement and Reporting A filter can be attached to measure each of the productivity components (Decision-making, Processing, and Communication) of email productivity. These filters aim to analyze their respective dimension and return a value. The Overall Productivity Score is computed based on these values.

In one embodiment the Overall Productivity Score can be computed based on the result of multiple, independent and adaptive filters. "Independent" means that new compatible filters, analyzing other parts or attributes of the productivity, can be dynamically added or removed from the system without affecting the system in any way. "Adaptive" means that these different filters are able to automatically modify their behavior based on the user's general behavior and the results from other filters.

Filters can include one or more of three factors Weight, Result, and Efficiency. W is an importance weight given to the filter by the system, R is the Result of the application of the filter to a message, and E is the Efficiency of that filter. In one embodiment, a weighted average of these factors is then taken using (W×E as a weight). The terms Weight, Result, and Efficiency are further described as follows:

Weight is the long-term effectiveness of the filter in productivity. The weight adaptively changes. It is based on "supervised" learning from the message recipient as well as historically collected data regarding the effectiveness of this filter in minimizing the deviance between expected productivity and actual productivity. The historically collected data is analyzed statistically and from an Artificial Intelligence vantage point to reassess the weight value (unsupervised learning). The weight is common to a set of messages.

Result is the actual score given to each message by the dimension analysis and is specific to the message. Result is the concrete expression of the productivity score computed for this dimension. RESULT answers the question "what is the productivity score of the email?" based on the filter findings.

Efficiency value expresses uncertainty regarding the Result. The more the result is judged as accurate, the higher is the efficiency. Efficiency is calculated based on the inputs given to the filter and can then be affected by rules across the different filters. Situation will impact the applicability/efficiency of a filter. Efficiency is specific to the message processed. EFFICIENCY answers the question "how accurate is my result?" given the input parameters. If the filter is not able to answer this question accurately, its efficiency is reduced and the system will favor the other filters. Where:

WEIGHT=W, RESULT=R, Efficiency=E;
Productivity f(Decision Making)=f($W_D$, $R_D$, $E_D$);
Productivity f(Processing)=f($W_P$, $R_P$, $E_P$);
Productivity f(Communication)=f($W_C$, $R_C$, $E_C$);

$$\text{Productivity Score} = \frac{[(W_D \times R_D \times E_D) + (W_P \times R_P \times E_P) + (W_C \times R_C \times E_C)]}{[(W_D \times E_D) + (W_P \times E_P) + (W_C \times E_C)]}$$

Figure 13:
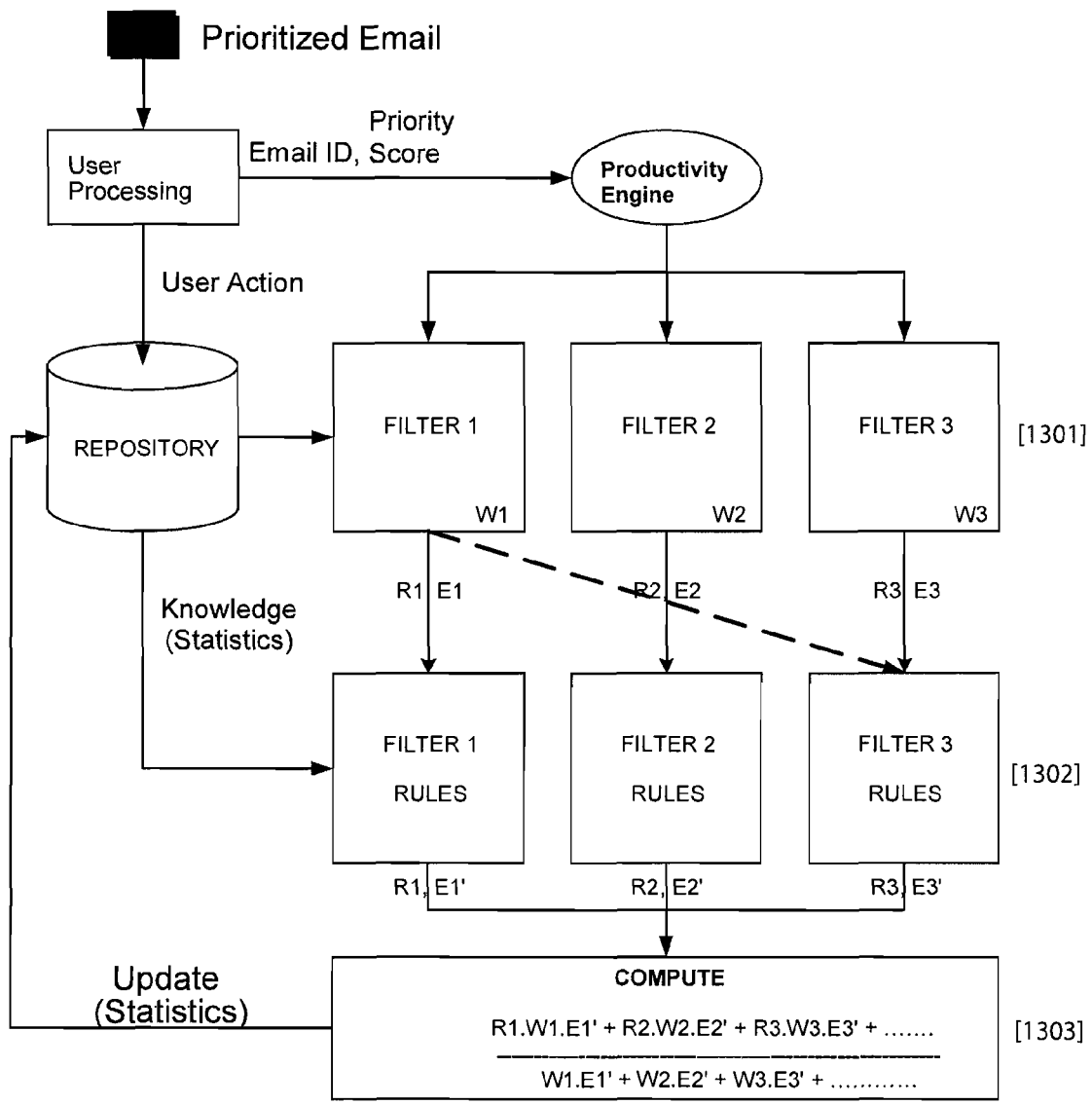
FIG. 13 illustrates email productivity measurement in accordance with an embodiment of the present invention.

In one embodiment, a filter analysis is performed in the three steps shown in the FIG. 13. Data Extraction [1301]: Each of the filters called by the processor will look at the information within and surrounding an email, to analyze a particular dimension. Filters will return two values: Result and Efficiency. Rules Application [1302]: if two filters are linked and if the result of one filter affects the result of the other filter, rules are applied to modify the Efficiency of the filters.

Productivity Computing [1303]: results of each filter are computed to obtain the final productivity value. The calculation involves the Result, the Efficiency as well as the Weight given for the filters. The productivity value returned by the calculation is a decimal value between 0 and 1 which could be displayed as a ranking score to the user.

Figure 14:
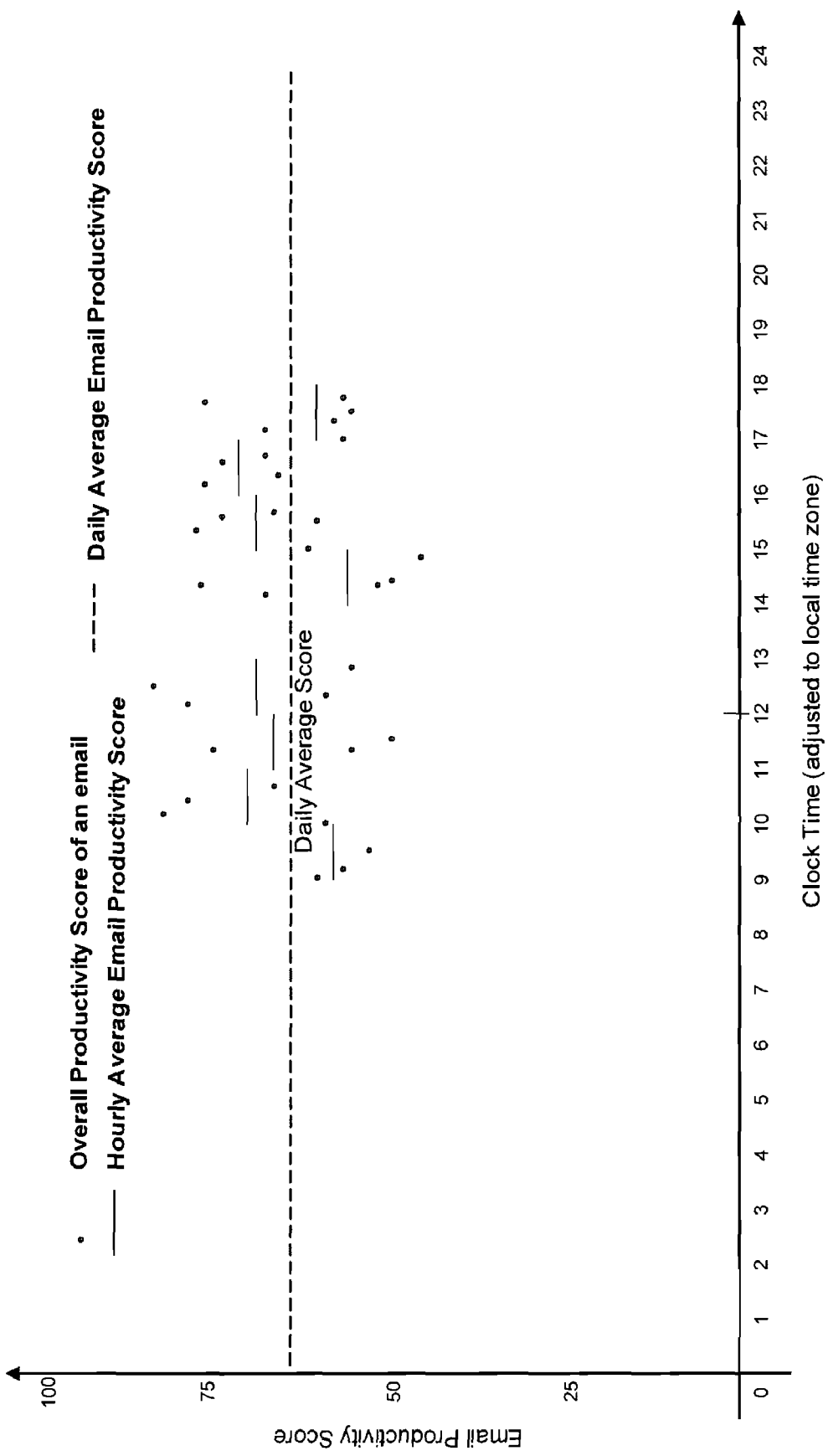
FIG. 14 illustrates email productivity score report in accordance with an embodiment of the present invention.

C.2.5) Email Productivity and Collaboration Trends Reports
Email Productivity Score Report (FIG. 14)

One embodiment includes plotting productivity score of each email ID (received and/or sent) against clock time (adjusted to local time zone) for a given user (or user group) and the given time duration. Furthermore average productivity score during the complete day (or average score during the business hours), and the average score during each hour is also displayed on the report. In an enterprise environment, a benchmark productivity score can be displayed and hourly performance may be measured against the benchmark. As an example (refer FIG. 14), the productivity is highest during 16:00 to 17:00 hours and the lowest from 14:00 to 15:00 hours.

Figure 15:
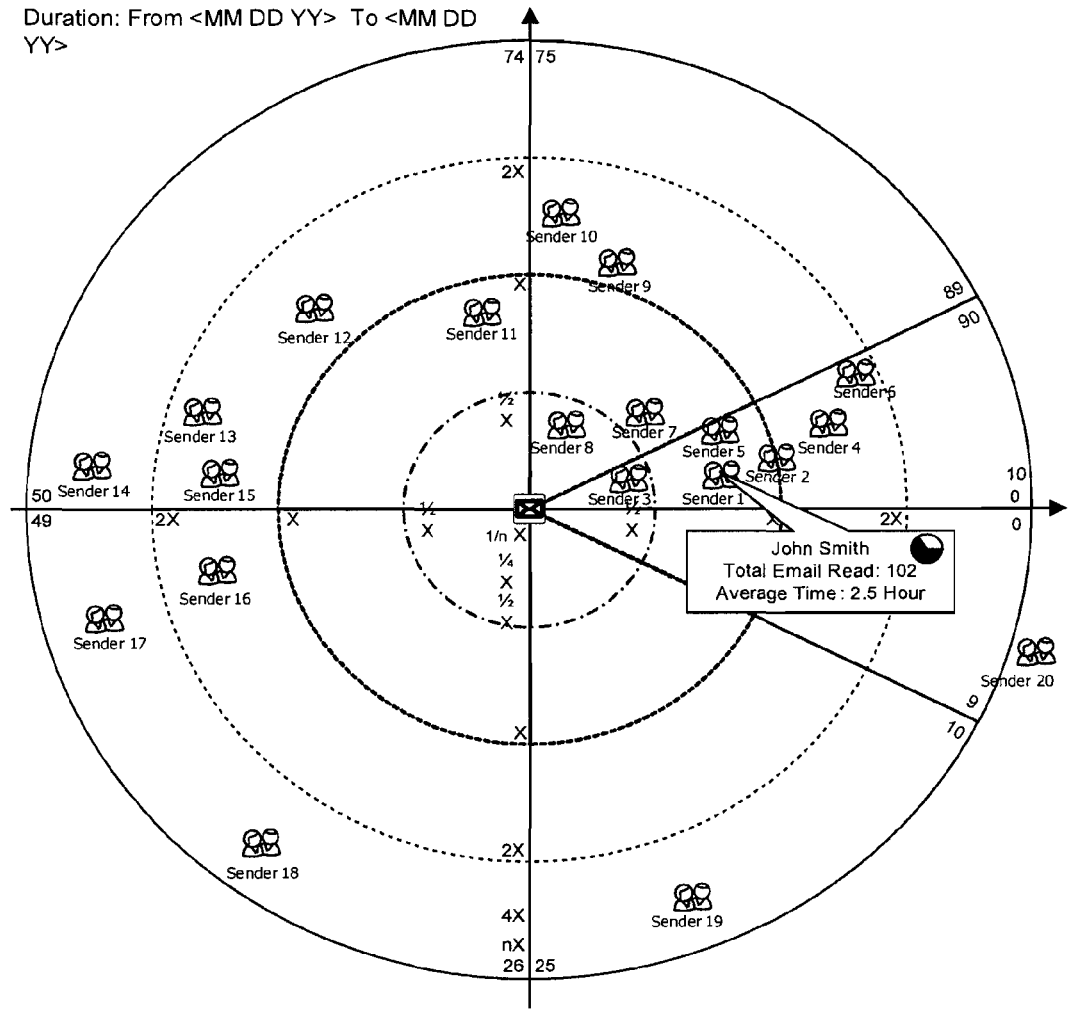
FIG. 15 illustrates recipient's collaboration relationship in accordance with an embodiment of the present invention.

User's Collaboration with Top 20 Senders (FIG. 15)

In an exemplary embodiment of the present invention, this report illustrates a user's (recipient's) collaboration relationship with the top 20 senders by email volume. Other embodiment includes selecting top 20 senders in order of their priority scores of the email received by the recipient. This analysis may be performed on a team, group or department level, for instance user (recipient) may be Sales Department at the Center and analysis may include how it collaborates with other departments such as Service, R&D and Production.

This analysis provides insight in regards to who the most active senders are and what their relative importance is to the user (recipient) in a given time duration. Referring FIG. 15, the user (recipient) is located in the Center. Each sender is located on the circle based on two coordinates, (a) Average Priority of email received by the user (recipient) from a given sender (Sender 1, Sender 2, . . . Sender 20) in a given duration. Average Priority is converted into angle (in degrees) by the following conversion:

$$\text{Angle(in degrees)} = -(\text{Priority Score}) \times 3.6.$$

For Example John Smith (one of the 20 senders) sent 9 emails to the user (recipient), in the duration Oct. 16-31, 2007. In the user's inbox, the priority scores of these email were 94, 96, 96, 95, 97, 96, 94, 98, and 98. The average priority score is 96. Therefore, angle coordinate for John Smith will be: $-(96) \times 3.6 = -345.6°$.

The important senders to the user will be in the top right hand quadrant of the collaboration circle (priority score 75 to 100), with the most important senders closer to the horizontal axis (−360 degrees). Referring FIG. 15, Sender 1 is the most important to the user, and Sender 20 is the least important to the user, in the select time duration.

(b) Average Time to Read by the user based on the email received from a given sender (Sender 1, Sender 2, Sender 3 . . . Sender 20) in the given duration. Average Time to Read (T) provides Radius dimension by using the following conversion:

Overall average Time to Read of the user=(X)
Circle radius=(R) is an algorithmic scale
Whereas X=½R.

T is plotted on the algorithmic scale, by using the following conversion:
If T=X then ½R. if T=2X then ¼R, if T=½X then ¼R, ... and so on.

Faster an email read by the user from a given sender, closer the sender would be towards the center. Referring FIG. 15, Sender 3 gets the fastest read response from the recipient, and Sender 19 gets the most delayed response. Sender 20 is on the periphery of the circle which means that the user may not have read any email sent by Sender 20 in the given time duration.

Another embodiment includes that by scrolling over a sender image, additional details may be displayed including sender's name, designation, contact details, photo, key statistics such as Time to Read, Number and % of email that were read by user from the selected sender (FIG. 15, assuming the user read 6 out of 9 email sent by John Smith, percentage read will 66% read—shown by a small pie chart). By double clicking on a sender image, the selected sender will now move to the center of the circle, and that the select sender's collaboration analysis with his own top 20 senders will now be displayed.

Figure 16:
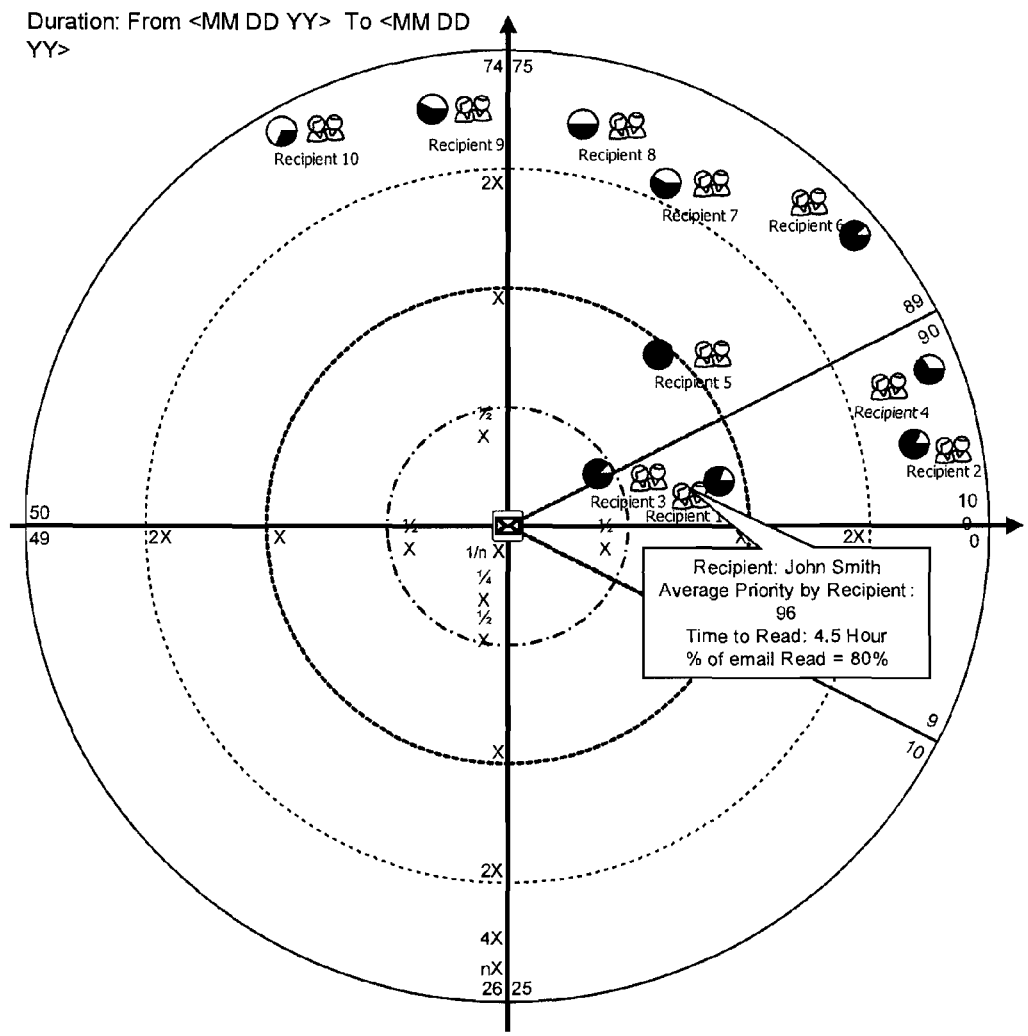
FIG. 16 illustrates collaboration relationship with a given sender in accordance with an embodiment of the present invention.

Top 10 Recipients Collaboration with a Given User (FIG. 16)

In an exemplary embodiment according to the present invention, this reports illustrates what collaboration relationship the top 10 recipients (by volume of email received from the user) have, with a given user (sender). Another embodiment includes selecting top 10 recipients in order of their average priority scores of the email received from the given user. This analysis may be performed on a team, group or department level, for instance user (sender) may be Sales Department at Center and analysis may include how other departments such as Service, R&D and Production collaborate with the Sales Department.

This analysis provides insight in regards to who are the most active recipients of a given user (sender), what relative importance do the recipients allocate to the user, in a give time duration.

Referring FIG. 16, the user (sender) is located in the Center. Each recipient is located on the circle based on two coordinates:

First, an average (recipient's) Priority of the email received by a recipient (recipient 1, recipient 2, ... recipient 10) from the given user (sender) in a given duration. Average Priority is converted into angle (in degrees) by the following conversion Angle(in degrees)=−(Priority Score)×3.6

For Example John Smith received 5 email from the given user (sender), in the duration Oct. 16-31, 2007. In John's mailbox, the received email had the following priority scores: 94, 96, 96, 96, and 98. The average priority is 96. The angle coordinate for John Smith will be: −(96)×3.6=345.6°.

The recipients who consider the user to be important will be in the top right hand quadrant of the collaboration circle (priority score 75 to 100), with the recipients who consider the user to be the most important closer to the horizontal axis (−360 degrees). Referring FIG. 16, Recipient 1 considers the user to be most important, and Recipient 10 considers the user to be the least important, in the selected time duration.

Second, an average Time to Read by a recipient (Recipient 1, Recipient 2, ... ) based on the email sent by the user in the given duration. Average Time to Read (T) provides Radius dimension by using the following conversion:
Overall average Time to Read of the user=(X)
Circle radius=(R) is an algorithmic scale
Whereas X=½ R.

T is plotted on the algorithmic scale, by using the following conversion:
If T=X then ½R. if T=2X then ¼R, if T=½X then ¼R, ... and so on.

Faster an email read by a recipient from the user, closer the sender would be towards the center. Referring FIG. 16, Recipient 3 gives the fastest read response to the user, and Recipient 10 gives the most delayed read response to the user.

Another embodiment includes that by scrolling over a recipient's image, additional details may be displayed including recipient's name, designation, contact details, photo, key statistics such as Time to Read, Number and % of email that were read by user from the selected sender (FIG. 16, assuming John read 4 out of 5 email sent by the user, % read will be 80%—as shown by a small pie chart next to Recipient 1). By double clicking on a recipient image, the selected recipient will now move to the center of the circle, and that the selected recipient's collaboration analysis with his own top 10 recipients will now be displayed.

Figure 17A:
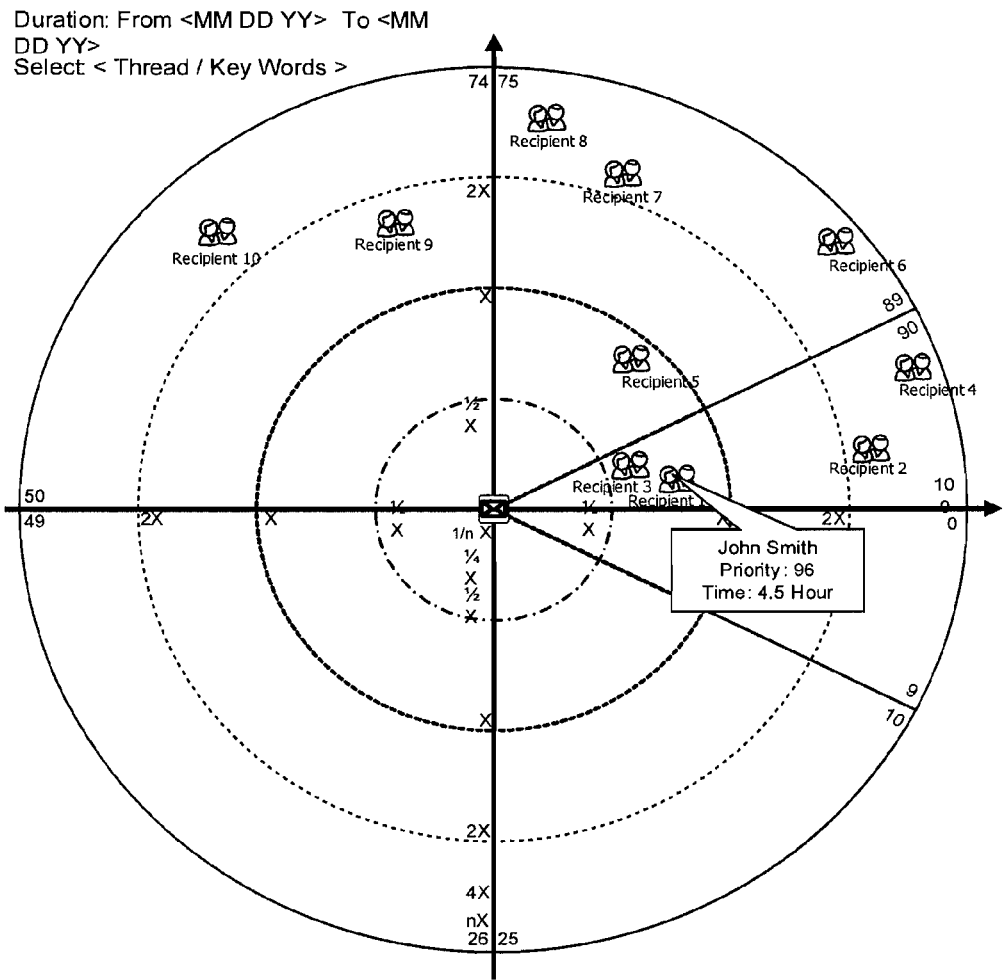
FIG. 17a illustrates email thread or keyword analysis in accordance with an embodiment of the present invention.
Figure 17B:
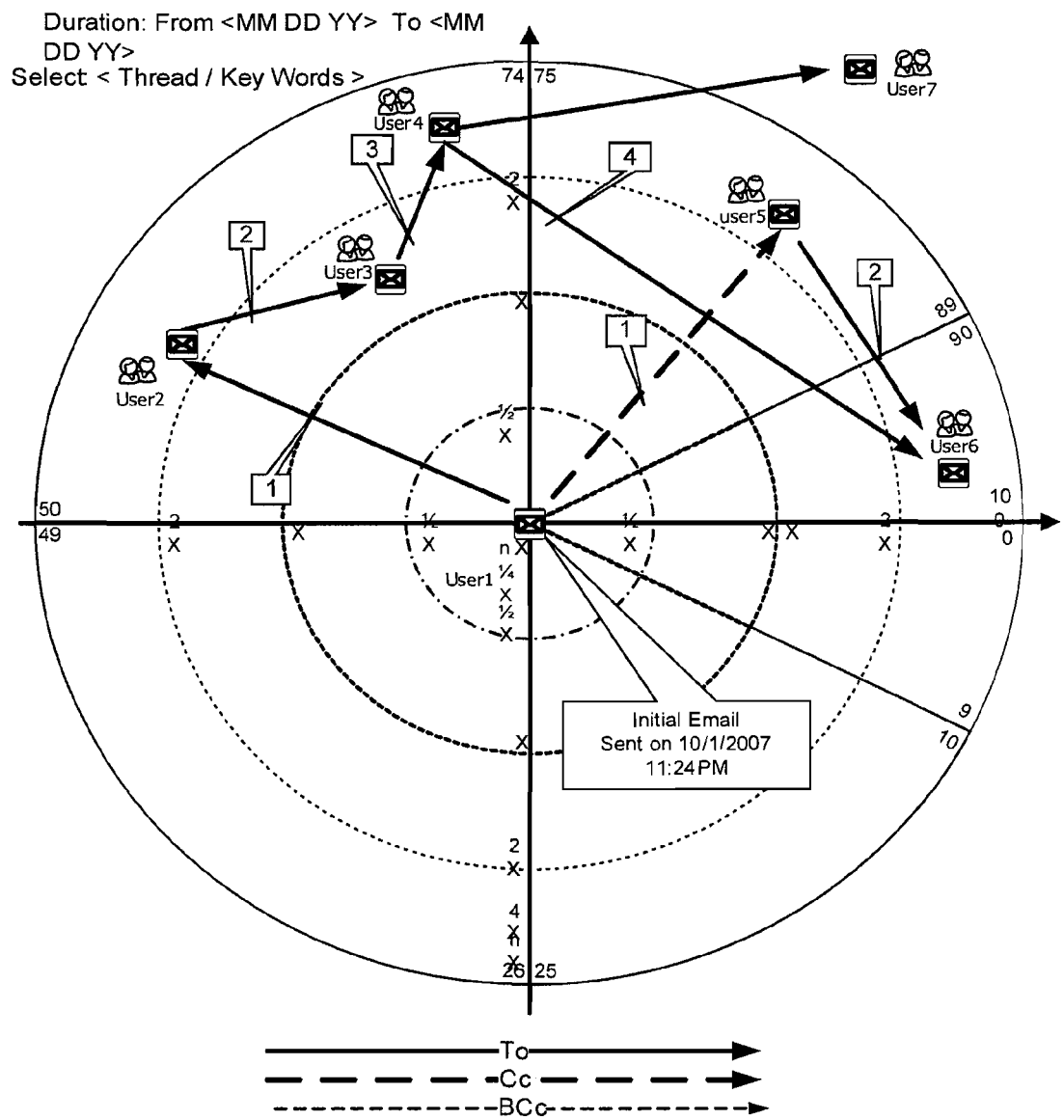
FIG. 17b illustrates email flow analysis.

Email Thread (or Keyword) and Email Flow Analysis (FIGS. 17a and 17b)

In another exemplary embodiment of the present invention, this report illustrates what collaboration relationship team members (working on specific projects or tasks, categorized as "keywords" or "Threads") have with one another, and if there any communication bottlenecks among them. This report may also be used for knowledge-management purposes in terms of who are all the people who have knowledge about a specific topic (keyword or email thread), and how much importance do they attach to the given topic.

This analysis may be performed on a team, group or department level, for instance a collaboration report may be illustrated on how an R&D department is in collaboration for "Cancer Drug" (keywords) with other departments such as Clinical Trails, Production, Sales, etc. The analysis is performed in the following steps:

a) Select Time Duration of the Analysis. For example: From <Jan. 1, 2007> to <Oct. 31, 2007> b) Add or select <one or more> Keywords (or Threads). Following options are also provided: Select top <10> keywords. This will select the top 10 most frequently occurring keywords in the email traffic of a selected user group.

c) Select <one or more> users, groups or departments to be considered in the analysis. Following options are also provided: Select top <10> users. It will select top 10 recipients who read the maximum email containing the key word (or email with the selected Thread). FIG. 17a, shows 10 recipients who had read email with the selected keywords.

d) Upon selecting the above parameters, the reporting system searches the productivity data and calculates the following values:

T=Average Time to Read for each Recipient (Recipient 1, Recipient 2, ... Recipient 10). This is based on all the email read by a recipient on the selected keywords (or Thread) in the given duration;

X=Overall Average Time to Read. This is based on the total email read on the selected keywords (or Thread) by all the selected recipients in the given duration. In other words, X is weighted average of T; and P=Average Priority Score for each Recipient. This is based on the priority of all the email which was read by the recipient.

e) Each recipient is plotted on the collaboration circle based on the following two coordinates: Angle (in Degrees) and Radius (algorithmic scale).

Average Priority is converted into angle (in degrees) by the following conversion:

Angle(in degrees)=−(Priority Score)×3.6

For Example John Smith received 5 email with the keyword "Cancer Drug" in the duration Jan. 1, 2007 to Oct. 31, 2007. In John's mailbox, these email had the following priority scores: 94, 96, 96, 96, and 98. The average priority is 96. The angle coordinate for John Smith will be: −(96)×3.6=−345.6°.

The recipients who consider the given keywords (or Threads) to be important will be in the top right hand quadrant of the collaboration circle (priority score 75 to 100). The recipients who consider the given keywords (or Thread) to be the most important will be located closer to the horizontal axis (−360 degrees). Referring FIG. 16, Recipient 1 considered the email with the keyword "Cancer Drug" to be the most important, and Recipient 10 considered the email with "cancer drug" user to be the least important, in the selected time duration.

Average Time to Read by a Recipient Converted to Radius

Average Time to Read (T) provides Radius dimension by using the following conversion:

Overall average Time to Read=(X);

Circle radius=(R) is an algorithmic scale; and

Whereas X=½R.

T is plotted on the algorithmic scale, by using the following conversion:

If T=X then ½R. if T=2X then ¼R, if T=½X then ¼R, . . . and so on.

The faster an email read by a recipient on the given "keywords" (or Threads), the closer the recipient would be towards the center. Referring FIG. 17a, Recipient 3 had the fastest read response to the email with the given "keywords" (or Thread), and Recipient 10 had the most delayed read response.

Those in the art will appreciate that a similar analysis can be performed using sent email analysis, that is analyzing sent or replied-to email containing the "keywords" (or Threads). Received email and sent email analysis can be combined to display important collaboration relationships. For instance, FIG. 17a displays the Flow Analysis of a particular email Thread in a selected duration. The thread originated from User 1, who sent it out To: User 2; and sent a Cc: User 5.

User 2 considered the email as Medium priority (Priority score 74-50) and forwarded to User 3. User 3 also considered the email as Medium Priority and sent to User 4. User 4 forwarded the message to user 6 and to another user outside the company (shown as User 7). User 5 also sent the email to User 6. User 6 considered these email to be high Priority, however there is no email sent by User 6 on this topic as of yet. This analysis may illustrate that the communication terminated at User 6, and perhaps User 6 is the key person among the team who is responsible for taking action on the email thread. The management can also analyze if the importance with which the matter was handled, is appropriate to the company goals and that the email has traveled outside the company network.

Thus, while there have been shown, described, and pointed out fundamental novel features of the invention as applied to several exemplary embodiments, it will be understood that various omissions, substitutions, and changes in the form and details of the devices illustrated, and in their operation, may be made by those skilled in the art without departing from the spirit and scope of the invention. Substitutions of elements from one described embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

We claim:

1. A method for graphical user interface ("GUI") based management of electronic communications, comprising the steps of:

receiving an electronic communication containing a message;

computing a situational prioritization value for an electronic communication dependent on a filter implementing a curve modeling a time-dependent equation representing the message's relative priority, where a weight is given to the importance of the type of curve in comparison to other curves, and an efficiency representing the validity of the filter at a particular time, wherein the situational prioritization value is updated during a lifecycle of the electronic communication;

computing an inherent prioritization value for the electronic communication dependent on a first factor based on message attributes, message content analysis, and personal or organizational rules and policies, a second factor representing an importance of the message's dimension being analyzed, and a third factor representing an estimated accuracy and validity based on an amount of information for the message's dimension being analyzes;

wherein the message content analysis includes consideration of: an intended number of recipients, a status of the message's initiator in an organization in which the message initiator is a member, a status of at least one of the message's active participant, a number of intermediate paths encountered by the electronic message before being received, at least one keyword in at least one of the subject and body of the message, a formatting of one of the electronic communication and the message and, if present, consideration of a name, file type and content of an attachment or an embedded message;

assigning a dynamic prioritization score to the electronic communication, wherein the dynamic prioritization score is a quantitative metric obtained using an overall combined situational and inherent prioritization model based on the situational prioritization value and the inherent prioritization value, the quantitative metric is based at least on user-defined criteria including a particular instant of time; and determining a prioritization category for each electronic communication based on the dynamic prioritization score.

2. The method of claim 1, wherein the prioritization category comprises graphical images.

3. The method of claim 1, wherein the prioritization category comprises color codes.

4. A GUI system for managing electronic communications, comprising:

a computer configured to operate a prioritization engine that assigns a prioritization score and a prioritization category to each electronic communication;

the prioritization engine further configured to:

compute a situational prioritization value for the electronic communication dependent on a filter implementing a curve modeling a time-dependent equation representing a message's relative priority, where a weight is given to the importance of the type of curve in comparison to other curves, and an efficiency representing the validity of the filter at a particular time, wherein the situational prioritization value is updated during a lifecycle of the electronic communication;

compute an inherent prioritization value for the electronic communication dependent on a first factor based on message attributes, message content analysis, and personal or organizational rules and policies, a second factor representing an importance of the message's dimension being analyzed, and a third factor representing an estimated accuracy and validity based on an amount of information for the message's dimension being analyzed;

wherein the message content analysis includes consideration of: an intended number of recipients, a status of the message's initiator in the organization, a status of at least one of the message's active participant, a number of intermediate paths encountered by the electronic message before being received, at lease one keyword in at least one of the subject and body of the message, a formatting of one of the electronic communication and the message and, if present, consideration of a name, file type and content of an attachment or an embedded message:

assign a dynamic prioritization score to the electronic communication, wherein the dynamic prioritization score is a quantitative metric obtained using an overall combined situational and inherent prioritization model based on the situational prioritization value and the inherent prioritization model based on the situational prioritization value and the inherent prioritization value, the quantitative metric is based at least on user-defined criteria including a particular instant of time;

a database configured to store the prioritization score; and the computer further controlling an interactive module configured to provide a user interaction to allow a user to assign a user-defined prioritization score to any of the plurality of the electronic communications;

wherein the electronic communications are arranged and displayed in GUI description.

5. The system of claim 4, wherein the prioritization score is based on a system-calculated prioritization score.

6. The system of claim 5, wherein the user can use a single click to provide the user-defined prioritization score which overrides the system-calculated prioritization score, and the user-defined prioritization score is used in determining the prioritization score.

7. The system of claim 6, wherein the database stores the overridden prioritization score based on the system-calculated prioritization score so that the user can reset the prioritization score of an electronic communication back to the overridden prioritization score based on the system-calculated prioritization score.

8. The system of claim 5, wherein user action provides feedback to the prioritization engine which the prioritization engine uses in assigning prioritization scores and categories.

9. The system of claim 4, further comprising:
a set of folders customizable according to a set of time duration and workflow rules; and
wherein the GUI depiction displays a prioritization category of each of the plurality of electronic communications.

10. The system of claim 4, wherein the interactive module further comprises a feature where the user may assign a prioritization category for a sender or a recipient of an electronic communication.

11. The system of claim 10, wherein the interactive module further comprises a lock function allowing the user to select a prioritization category for a given sender or a given recipient so that all electronic communications with the given sender or the given recipient is assigned the user selected prioritization category.

12. The system of claim 4, wherein the interactive module further comprises a plurality of single-click workflow action buttons that allow the user to take a plurality of actions in response to at least one of the electronic communications and update the system according to the user interaction.

13. The system of claim 12, wherein the plurality of single-click workflow action buttons comprises a "Defer" function, allowing the user to select a date by which to respond to the electronic communication.

14. The system of claim 12, wherein the plurality of single-click workflow action buttons comprises a "To Do" function, allowing the user to mark the electronic communication so that the user is reminded to take action in response to the electronic communication.

15. The system of claim 12, wherein the plurality of single-click workflow action buttons comprises a "Complete" function, allowing the user to mark that an action associated with at least one of the electronic communications has been completed and the electronic communication is moved to a Completed Items folder or a prioritized archiving system, or any other processing specified by the user.

16. The system of claim 12, wherein the plurality of single-click workflow action buttons comprises a quick action function, allowing the user to select one of a plurality of canned responses, wherein a type of response and content of response are customizable by the user.

17. The system of claim 16, wherein the plurality of canned responses includes at least one of "Call Me" and "See Me."

18. The system of claim 4, wherein the plurality of electronic communications are archived in different folders based on the prioritization score of the communication.

19. The system of claim 4, further comprising a search function that arranges a result of a search based on the prioritization score of the electronic communication where the result was found.

20. A method for determining a productivity score for an individual's use of electronic communications, comprising the steps of:
computing a situational prioritization value for an electronic communication dependent on a filter implementing a curve modeling a time-dependent equation representing a message's relative priority, where a weight is given to the importance of the type of curve in comparison to other curves, and an efficiency representing the validity of the filter at a particular time, wherein the situational prioritization value is updated during a lifecycle of the electronic communication;
computing an inherent prioritization value for the electronic communication dependent on a first factor based on message attributes, message content analysis, and personal or organizational rules and policies, a second factor representing an importance of the message's dimension being analyzed, and a third factor representing an estimated accuracy and validity based on an amount of information for the message's dimension being analyzed;
wherein the message content analysis includes consideration of: an intended number of recipients, a status of the message's initiator in an organization in which the message initiator is a member, a status of at least one of the message's active participant, a number of intermediate paths encountered by the electronic message before being received, at least one keyword in at least one of the subject and body of the message, a formatting of one of the electronic communication and the message and, if present, consideration of a name, file type and content of an attachment or an embedded message;
assigning a prioritization score to each of a plurality of electronic communications, wherein the dynamic prioritization score is a quantitative metric obtained using an overall combined situational and inherent prioritization model based on the situational prioritization value and the inherent prioritization value, the quantitative metric is based at least on user-defined criteria including a particular instant of time;

determining a prioritization category for each of the plurality of electronic communications based on the prioritization score;

determining values for at least a decision-making metric, a processing metric and a communication metric based on the individual's use of electronic communications; and calculating the productivity score as a function of at least one of the decision-making, the processing metric, and communication metric.

21. The method of claim 20, wherein the productivity score is calculated according to the following:

$$\text{function(Email Productivity)}_T = \text{function(working on email in decreasing order of email priority)}_T;$$

wherein T is a period of time over which the measure of productivity is measured.

22. The method of claim 20, wherein the decision-making metric comprises:
a calculation based on the prioritization score associated with an electronic communication;
a length of time taken by the individual to complete an action associated with the electronic communication; and
prioritization scores associated with electronic communications upon which the user has not completed an action.

23. The method of claim 22, wherein the decision-making metric is calculated according to the following:

$$R_D = \text{function}(S_D, M_D) \times 100;$$

$$S_D = \left( \frac{\sum_{p>n}^{w} (\text{Number of email COMPLETE})}{\sum_{p>n}^{w} (\text{Number of email for TO-DO})} \right) \times$$

$$\left( \frac{\sum_{p=n}^{n} (\text{Number of email COMPLETE})}{\sum_{p=n}^{n} (\text{Number of email for TO-DO})} \right)$$

$$M_D = \text{function}(t_D/t_D \text{avg});$$

wherein $t_D$ is an Actual Time to Complete an email;
wherein $t_D$ avg is an Overall Average Time to Complete based on T1, wherein
T1 is a number of days a given prioritization category email is kept in a respective Prioritized View Folder;
wherein $M_D$ is efficiency;
wherein $R_D$ is the decision-making metric;
wherein $S_D$ is the effectiveness;
n is the prioritization category of an electronic communication completed;
p is the prioritization category;
w is a positive integer;
wherein Σ (number of email COMPLETE) is a cumulative number of emails set to COMPLETE in duration of T;
wherein Σ (number of email TO-DO) is a cumulative number of emails which are set to TO-DO in a duration T;

T is a duration (T2−T1), T2 being an instant of time when a user marked a given email to COMPLETE; and
wherein integers p, n, and w are based on a numerical value of the prioritization category of the email, and the integer w is a maximum on the numerical value of the email prioritization category.

24. The method of claim 20, wherein the processing metric comprises:
a calculation based on the prioritization score associated with an electronic communication;
a length of time taken by the individual to read the electronic communication; and
prioritization scores associated with unread electronic communications.

25. The method of claim 24, wherein the processing metric is calculated according to the following:

$$R_D = \text{function}(S_D, M_D) \times 100;$$

$$S_D = \left( \frac{\sum_{p>n}^{w} (\text{Number of email READ})}{\sum_{p>n}^{w} (\text{Number email RECEIVED})} \right) \times \left( \frac{\sum_{p=n}^{n} (\text{Number of email READ})}{\sum_{p=n}^{n} (\text{Number email RECEIVED})} \right)$$

$$M_D = \text{function}(t_D/t_D \text{avg});$$

wherein $t_D$ is an Actual Time to read an email;
wherein $t_D$ avg is an Overall Average Time to read based on T1, wherein T1 is a number of days a given prioritization category email is kept in a respective Prioritized View Folder;
wherein $M_D$ is efficiency;
wherein $R_D$ is the processing metric;
wherein $S_D$ is the effectiveness;
n is the prioritization category of an electronic communication read;
p is the prioritization category;
w is a positive integer;
wherein Σ (number of email COMPLETE) is a cumulative number of emails set to READ in duration of T;
wherein Σ (number of email TO-DO) is a cumulative number of emails which are set to RECEIVED in a duration T;
T is a duration (T2−T1), T2 being an instant of time when a user marked a given email to READ; and
wherein integers p, n, and w are based on a numerical value of the prioritization category of the email, and the integer w is a maximum on the numerical value of the email prioritization category.

26. The method of claim 20, wherein the communication metric comprises:
a calculation based on the prioritization score associated with an electronic communication;
a length of time taken by the individual to respond to the electronic communication;
prioritization scores associated with electronic communications not yet responded to.

27. The method of claim 26, wherein the communication metric is calculated according to the following:

$$R_C = \text{function}(S_C, M_C, Ac) \times 100;$$

$$M_C = \text{function}(t_D/t_D \text{avg}),$$

wherein $R_C$ is the communication metric;

wherein $S_C$ is effectiveness, and a value of Sc is a function of the numerical value of one of the prioritization category and the prioritization score;

wherein $A_C$ is a same email thread efficiency, and a value of $A_C$ is a function of a number of email sent on the same thread to the same sender in a duration of $T_C$ hours, wherein $T_C$ is based on a user-behavior specific and a user's work environment specific factors;

wherein $M_C$ is efficiency and a value of $M_C$ is a function of t/t avg, and Actual Time (t) to reply and an Overall Average Time (t avg) to reply to an email for one of a corresponding prioritization category and a corresponding prioritization score;

wherein $t_C$ is an Actual Time to reply to an email; and wherein $t_C$ avg is an Overall Average Time to reply based on T1, wherein T1 is a number.

28. The method of claim 20, wherein the productivity score is computed according to the following:

wherein W is a weight defined as a long-term effectiveness of a filter in productivity;

wherein R is a result defined as a productivity score given to each message by a dimension analysis;

wherein E is an efficiency defined as certainty regarding measure the accuracy of the result;

Productivity f(Decision Making)=$f(W_D, R_D, E_D)$;
Productivity f(Processing)=$f(W_P, R_P, E_P)$;
Productivity f(Communication)=$f(W_C, R_C, E_C)$; and $$\text{Productivity Score} = \frac{[(W_D \times R_D \times E_D) + (W_P \times R_P \times E_P) + (W_C \times R_C \times E_C)]}{[(W_D \times E_D) + (W_P \times E_P) + (W_C \times E_C)]}$$

wherein, $W_D$, $R_D$ and $E_D$ are respectively defined as the Weight, Result and Efficiency of a Decision Making Productivity filter, $W_P$, $R_P$, $E_P$ are respectively defined as the Weight, Result and Efficiency of a Processing Productivity filter, and $W_C$, $R_C$, $E_C$ are respectively defined as the Weight, Result and Efficiency of a Communication Productivity filter.

* * * * *